(12) United States Patent
Hoshida

(10) Patent No.: US 9,882,642 B2
(45) Date of Patent: Jan. 30, 2018

(54) OPTICAL REMODULATOR THAT REMODULATES MODULATED OPTICAL SIGNAL AND OPTICAL REMODULATION METHOD

(71) Applicant: FUJITSU LIMITED, Kawasaki-shi, Kanagawa (JP)

(72) Inventor: Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/251,165

(22) Filed: Aug. 30, 2016

(65) Prior Publication Data

US 2017/0104535 A1    Apr. 13, 2017

(30) Foreign Application Priority Data

Oct. 9, 2015 (JP) ................................. 2015-201124

(51) Int. Cl.
*H04B 10/04* (2006.01)
*H04B 10/25* (2013.01)
(Continued)

(52) U.S. Cl.
CPC ......... *H04B 10/2504* (2013.01); *H04B 10/29* (2013.01); *H04J 14/02* (2013.01);
(Continued)

(58) Field of Classification Search
CPC .......... H04J 14/02; H04J 14/06; H04B 10/29; H04B 10/291; H04B 10/532; H04B 10/2504
(Continued)

(56) References Cited

U.S. PATENT DOCUMENTS

2004/0013433 A1* 1/2004 Alexander ............ H04B 10/29
                                                           398/91
2004/0125435 A1   7/2004 Liu et al.
(Continued)

FOREIGN PATENT DOCUMENTS

JP   2009-60461    3/2009
JP   2012-120010   6/2012

OTHER PUBLICATIONS

Benjamin Foo et al., "Optoelectronic method for distributed compensation of XPM in long haul WDM systems", Optical Fiber Communications Conference and Exhibition (OFC), DOI: 10.1364/OFC.2015.Th2A.24 (2015), 3 pages.
(Continued)

*Primary Examiner* — Hanh Phan
(74) *Attorney, Agent, or Firm* — Fujitsu Patent Center

(57) ABSTRACT

An optical remodulator includes: a polarization diversity modulator configured to modulate an input optical signal to generate an output optical signal by using a first optical modulator implemented for a first polarization state and a second optical modulator implemented for a second polarization state that is orthogonal to the first polarization state; a photo detector configured to optical-to-electrical convert the input optical signal or the output optical signal or both of the optical signals into an electric signal; and a drive signal generator configured to generate a first drive signal that drives the first optical modulator and a second drive signal that drives the second optical modulator based on the electric signal generated by the photo detector.

8 Claims, 18 Drawing Sheets

(51) Int. Cl.
*H04J 14/02* (2006.01)
*H04J 14/06* (2006.01)
*H04Q 11/00* (2006.01)
*H04B 10/29* (2013.01)

(52) U.S. Cl.
CPC .......... *H04J 14/06* (2013.01); *H04Q 11/0005* (2013.01); *H04B 2210/256* (2013.01); *H04Q 2011/0009* (2013.01); *H04Q 2011/0015* (2013.01); *H04Q 2011/0039* (2013.01); *H04Q 2011/0041* (2013.01)

(58) Field of Classification Search
USPC ... 398/79, 83, 158, 159, 173, 175, 176, 177, 398/178, 179, 180, 181, 184, 183, 152, 398/65, 188, 154, 155
See application file for complete search history.

(56) References Cited

U.S. PATENT DOCUMENTS

| | | | | |
|---|---|---|---|---|
| 2006/0051092 | A1* | 3/2006 | Way | H04J 14/02 398/79 |
| 2009/0060508 | A1 | 3/2009 | Tanimura et al. | |
| 2010/0014874 | A1 | 1/2010 | Kawanishi et al. | |
| 2012/0106962 | A1 | 5/2012 | Tanimura et al. | |
| 2012/0141130 | A1 | 6/2012 | Nakashima et al. | |
| 2016/0105243 | A1* | 4/2016 | Wang | H03M 13/255 398/184 |

OTHER PUBLICATIONS

Feng Tian et al., "Generation of 50 Stable Frequency-Locked Optical Carriers for Tb/s Multicariier Optical Transmission Using a Recirculation Frequency Shifter", Journal of Lightwave Technology, vol. 29, No. 8, (Apr. 15, 2011), pp. 1085-1091 (7 pages).
Satoshi Shimizu et al., "Demonstration of Multi-hop Optical Add-Drop Network with High Frequency Granular Optical Channel Defragmentation Nodes", Optical Fiber Communications Conference and Exhibition (OFC), (2015) 3 pages.
Benjamin Foo et al., "Optoelectronic method for inline compensation of XPM in long-haul optical links", Optics Express, vol. 23, No. 2 (2015), pp. 859-872 (14 pages).
Tetsuya Kawanishi et al., "High-Speed Optical FSK Modulator for Optical Packet Labeling", Journal of Lightwave Technology, vol. 23, No. 1 (Jan. 2005), pp. 87-94 (8 pages).
EESR—Partial European Search Report of European Patent Application No. 16185468.2 dated Feb. 15, 2017.
Xu et al., "Compensation of nonlinear self-phase modulation with phase modulators", Electronics Letters, 21st Nov. 2002, vol. 38, No. 24, pp. 1578-1579. XP006019343.
EESR—Extended European Search Report of European Patent Application No. 16185468.2 dated May 22, 2017.
Xu C, et al., "Compensation of nonlinear self-phase modulation with phase modulators", Electronics Letters, IEE Stevenage, GB, vol. 38, No. 24, Nov. 21, 2002, pp. 1578-1579, XPE006019343.

\* cited by examiner

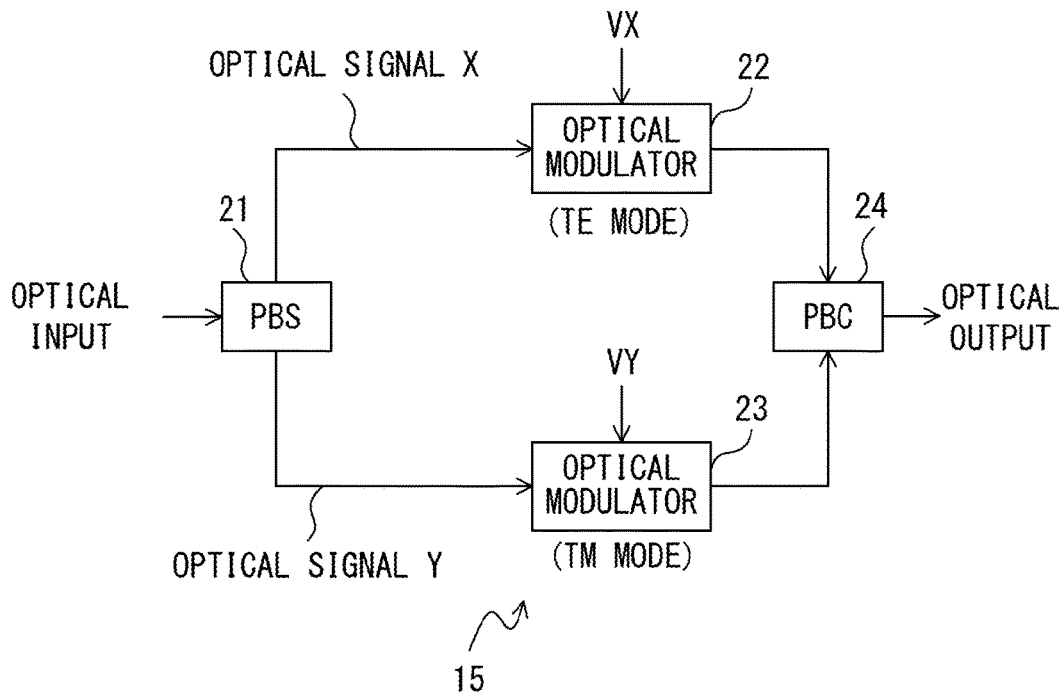
F I G. 3 A
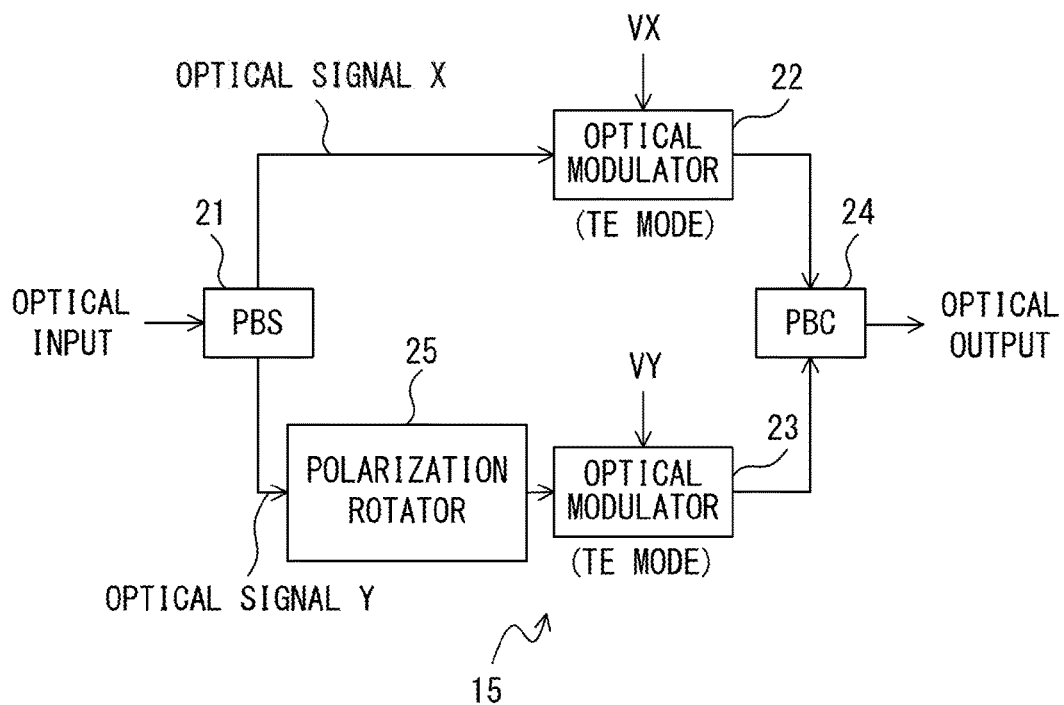
F I G. 3 B

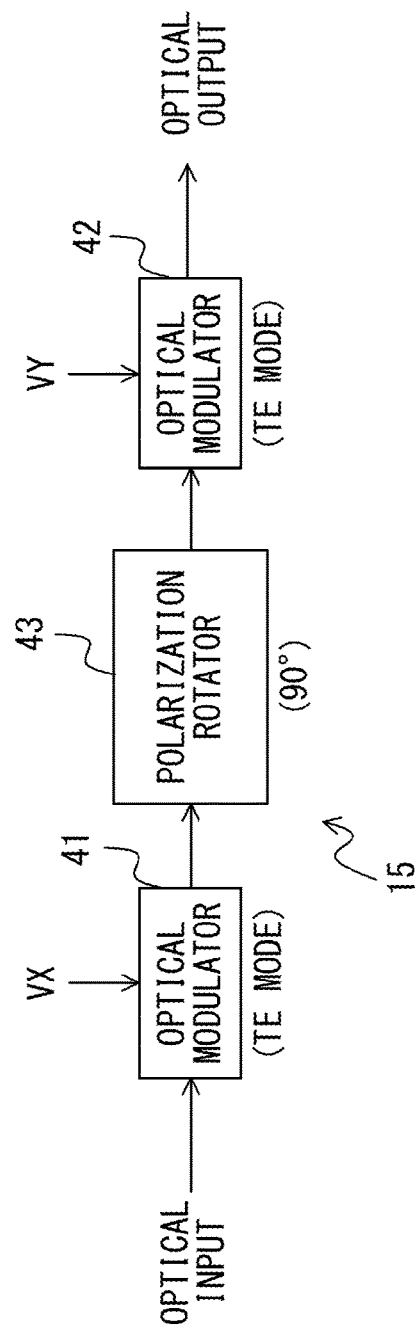
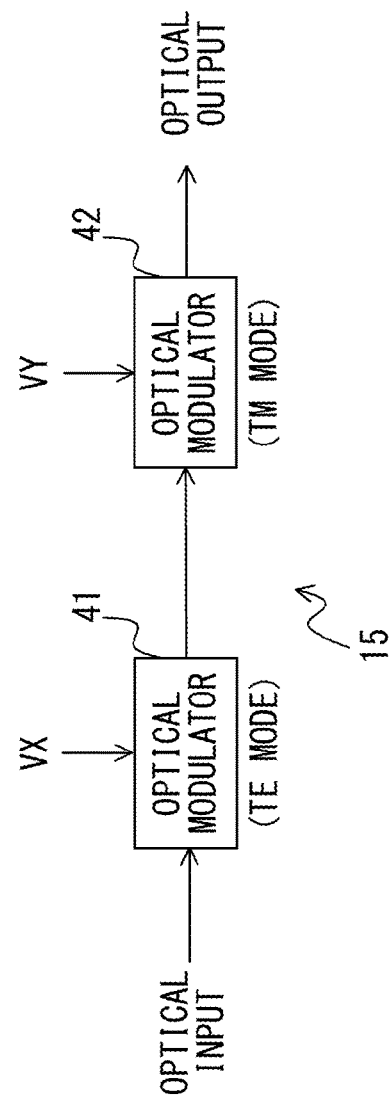
F I G. 5 A
F I G. 5 B

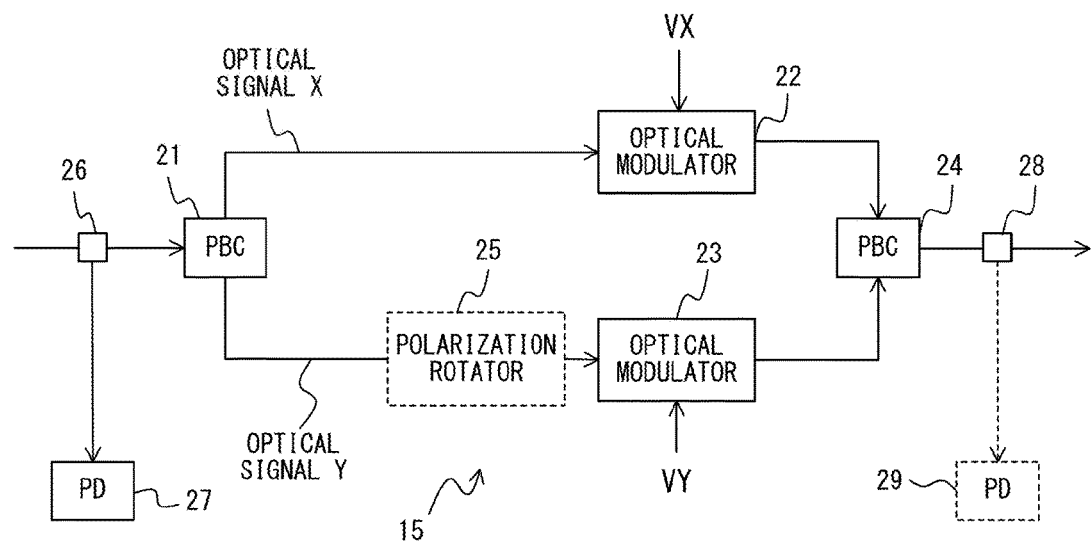
F I G. 6 A
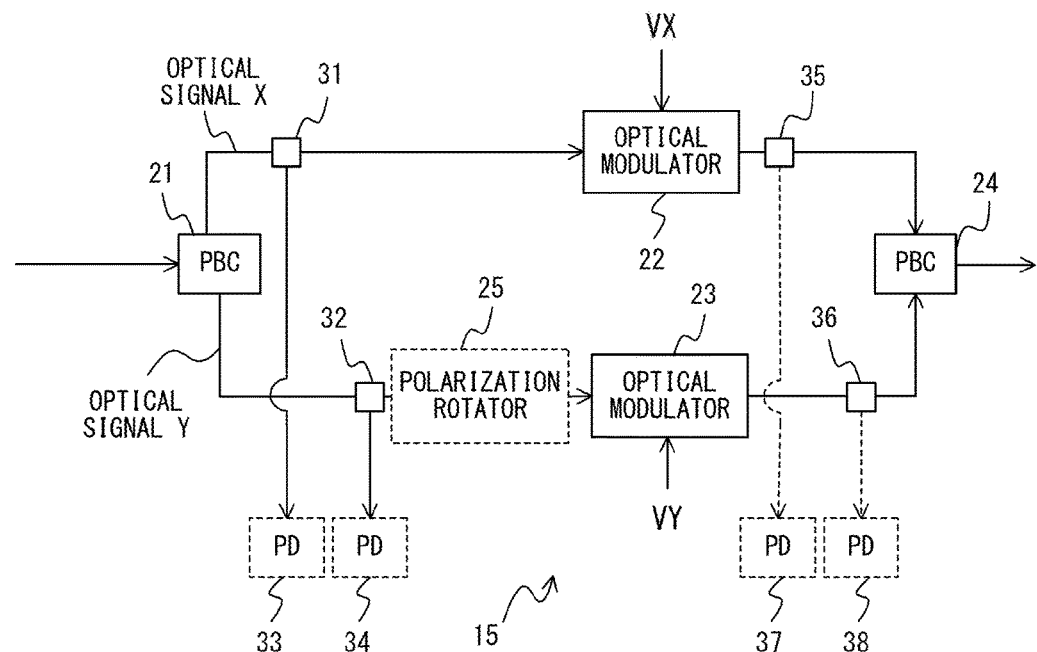
F I G. 6 B

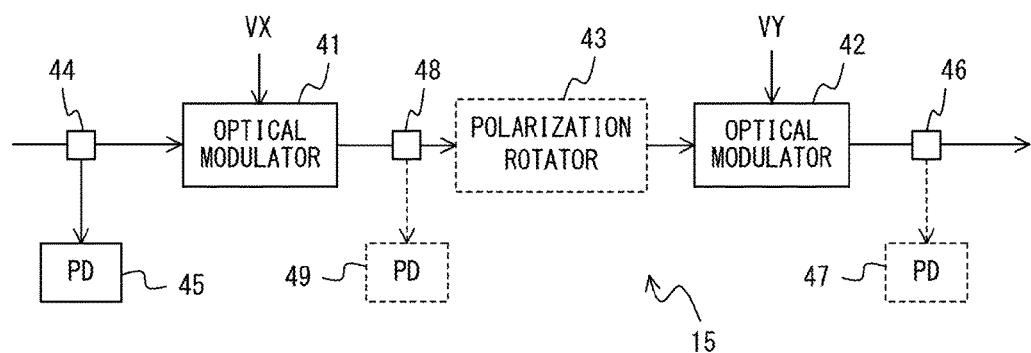
F I G. 7 A
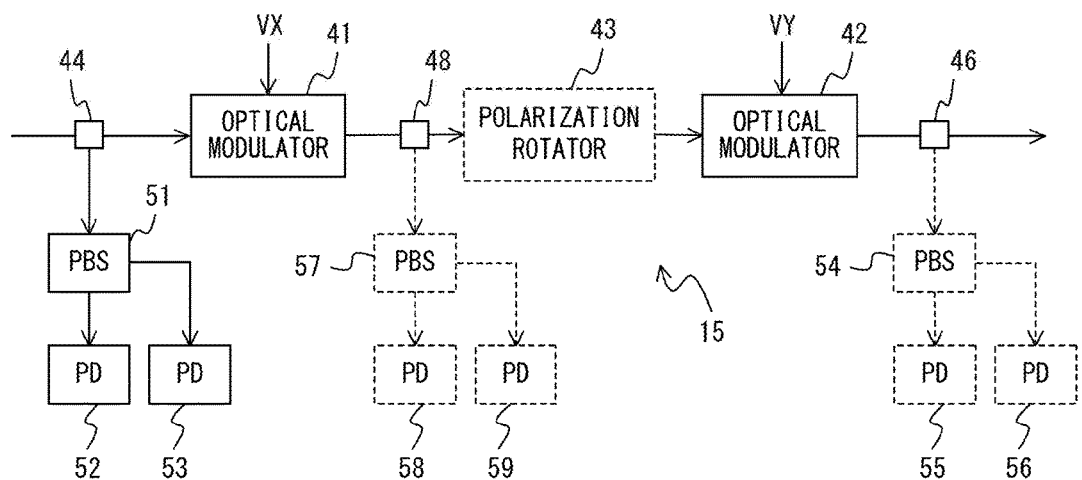
F I G. 7 B

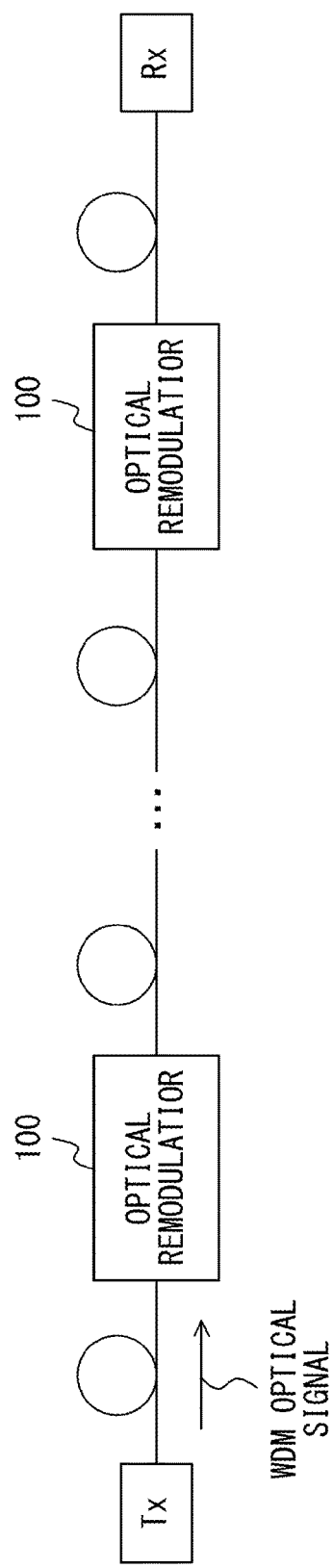
F I G. 8

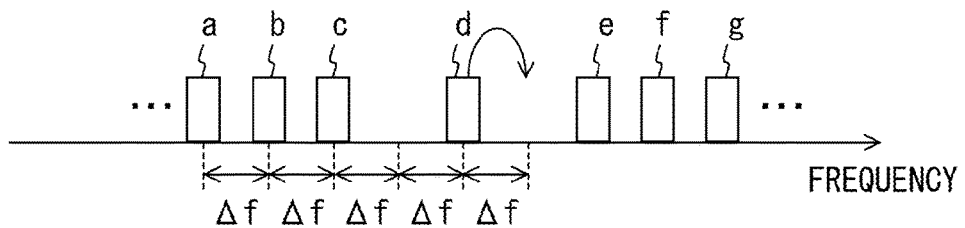
F I G. 1 2 A
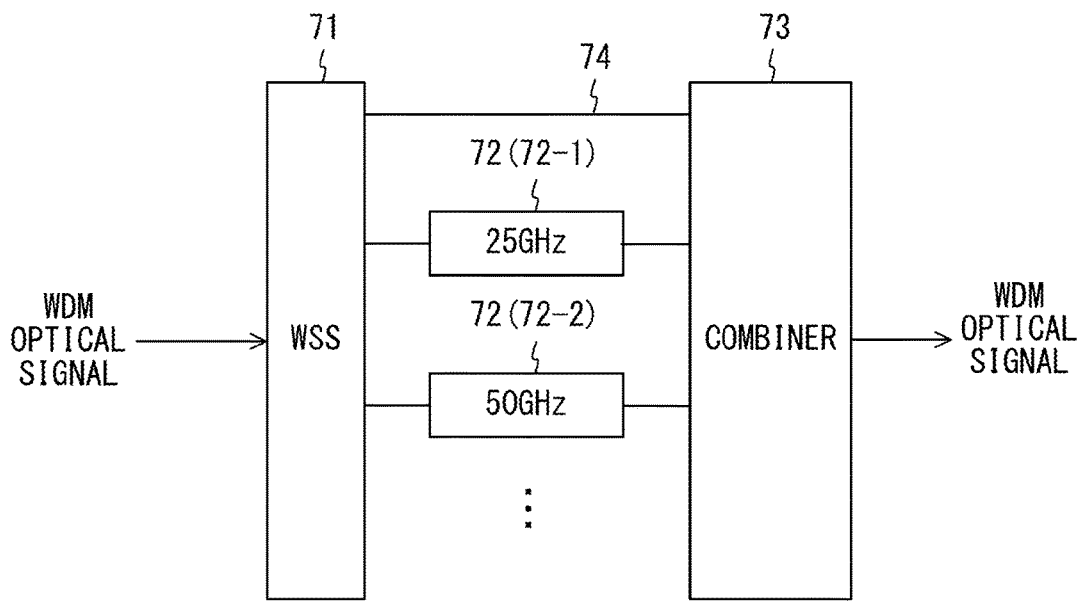
F I G. 1 2 B
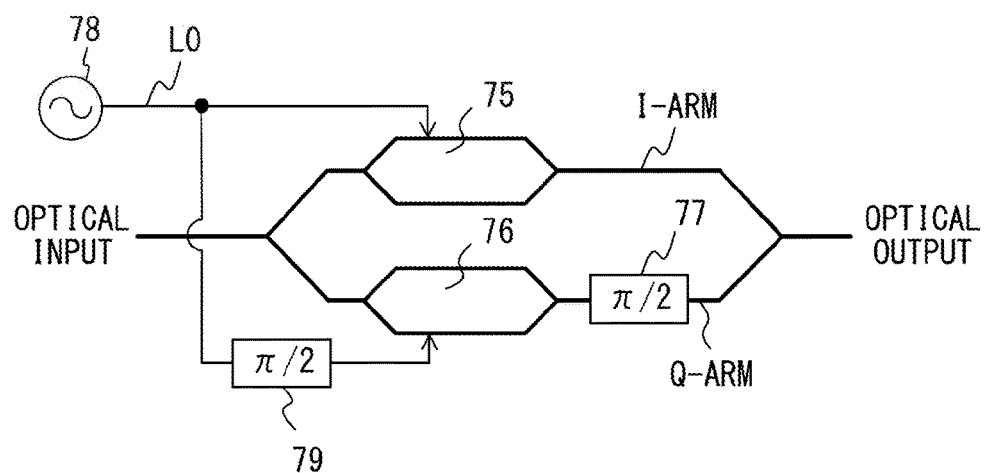
F I G. 1 2 C

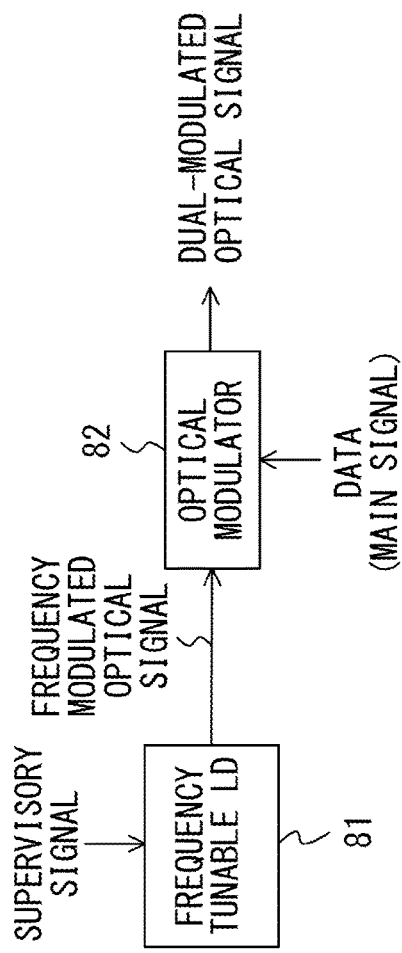
F I G. 1 4 A
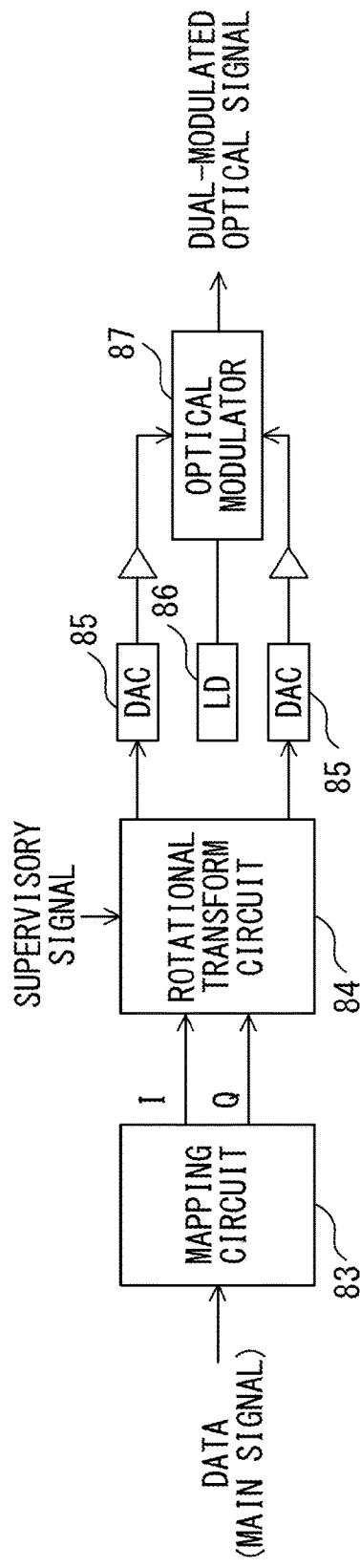
F I G. 1 4 B

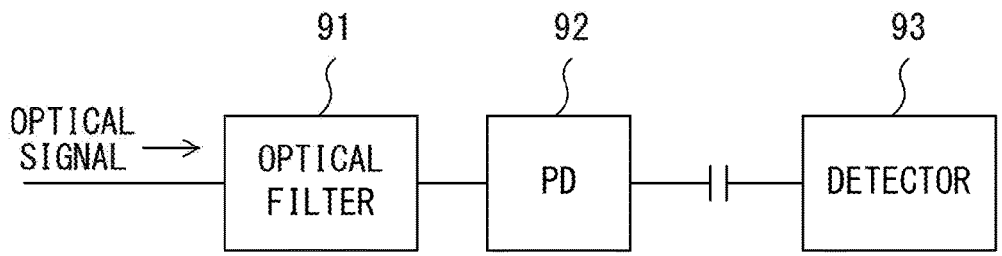
F I G. 16 A
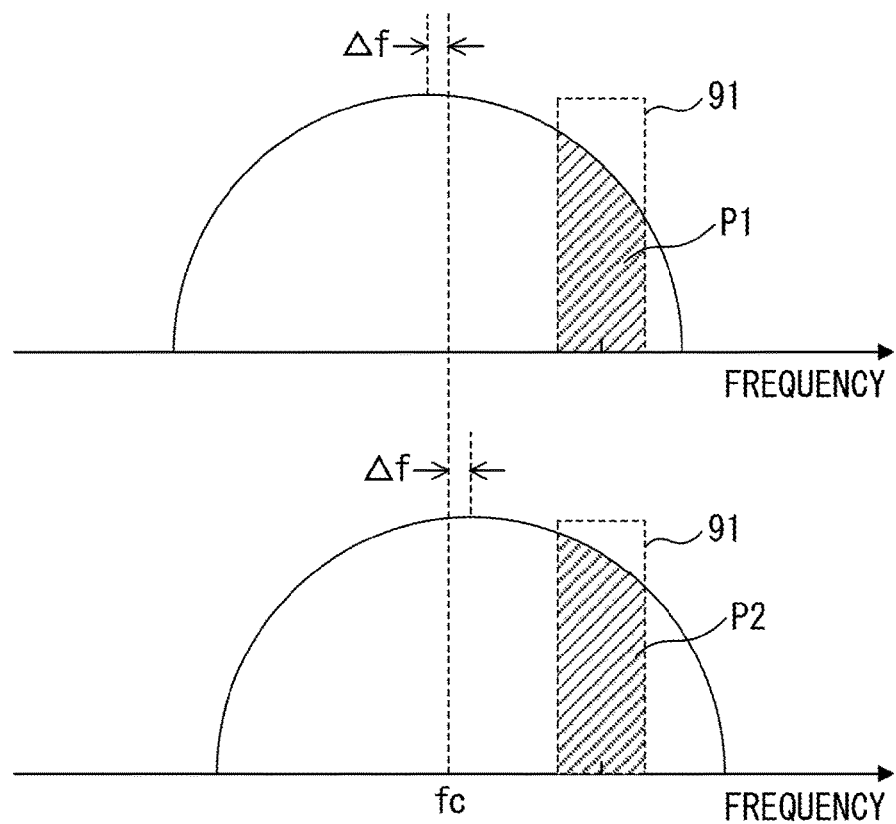
F I G. 16 B

|  | SYMBOL1 | SYMBOL2 | SYMBOL3 | SYMBOL4 |
|---|---|---|---|---|
| OLD SIGNAL | 0 ($-\Delta f$) | 1 ($+\Delta f$) | 1 ($+\Delta f$) | 0 ($-\Delta f$) |
| INPUT OPTICAL SIGNAL | $fc-\Delta f$ | $fc+\Delta f$ | $fc+\Delta f$ | $fc-\Delta f$ |
| NEW SIGNAL | 1 ($+\Delta f$) | 1 ($+\Delta f$) | 0 ($-\Delta f$) | 1 ($+\Delta f$) |
| DIFFERENCE | $+2\Delta f$ | ZERO | $-2\Delta f$ | $+2\Delta f$ |
| OUTPUT OPTICAL SIGNAL | $fc+\Delta f$ | $fc+\Delta f$ | $fc-\Delta f$ | $fc+\Delta f$ |
| RECEIVER | 1 | 1 | 0 | 1 |

FIG. 18

OPTICAL REMODULATOR THAT REMODULATES MODULATED OPTICAL SIGNAL AND OPTICAL REMODULATION METHOD

CROSS-REFERENCE TO RELATED APPLICATION

This application is based upon and claims the benefit of priority of the prior Japanese Patent Application No. 2015-201124, filed on Oct. 9, 2015, the entire contents of which are incorporated herein by reference.

FIELD

The embodiments discussed herein are related to an optical remodulator that remodulates a modulated optical signal and an optical remodulation method.

BACKGROUND

The amount of information transmitted through an optical network has increased dramatically. Further, a configuration in which a path that is to be established in an optical network can be flexibly changed has been required. Thus, a method for processing, between an optical transmitter and an optical receiver, an optical signal that is transmitted from the optical transmitter so as to improve performance and/or a function of an optical network has been proposed.

In order to mitigate a waveform distortion due to nonlinear effects in an optical fiber, a method for remodulating an optical signal so as to make a transmission distance longer has been proposed (see, for example, Documents 1 and 2 below). A method for RZ-pulsing an optical signal with a clock signal synchronized with a data signal so as to make a transmission distance longer has been proposed (see, for example, Japanese Laid-open Patent Publication No. 2009-60461 (Japanese Patent No. 5088052)). A method for performing a frequency shift for one or more optical signals in a WDM optical signal by optical remodulation so as to decrease fragmentation of a spectrum and to improve frequency utilization efficiency has been proposed (see, for example, Documents 3 and 4 below). A method for superimposing, for example, by frequency modulation, a supervisory signal on an optical signal that transmits a main signal has been proposed (see, for example, Japanese Laid-open Patent Publication No. 2012-120010, U.S. Patent Application Publication No. 2010/0014874 (U.S. Pat. No. 7,957,653), and Document 5 below).

Document 1: Benjamin Foo et al., Optoelectronic method for distributed compensation of XPM in long haul WDM systems, OFC 2015, Th2A, 24

Document 2: Benjamin Foo et al., Optoelectronic method for inline compensation of XPM in long-haul optical links, Optics Express, Vol. 23, issue 2, pp. 859-872 (2015)

Document 3: Satoshi Shimizu et al., Demonstration of Multi-hop Optical Add-Drop Network with High Frequency Granular Optical Channel Defragmentation Nodes, OFC 2015, M21.4

Document 4: Feng Tian et al., Generation of 50 Stable Frequency-Locked Optical Carriers for Tb/s Multicarrier Optical Transmission Using a Recirculating Frequency Shifter, JOURNAL OF LIGHTWAVE TECHNOLOGY, VOL. 29, NO. 8, Apr. 15, 2011

Document 5: Tetsuya Kawanishi et al., High-Speed Optical FSK Modulator for Optical Packet Labeling, JOURNAL OF LIGHTWAVE TECHNOLOGY, VOL. 23, NO. 1, JANUARY 2005

The polarization state of an optical signal varies when it is transmitted through an optical fiber cable. On the other hand, an optical modulator has a polarization dependence. Thus, in order to improve modulation efficiency of the optical modulator, it is preferable that the polarization state of an optical signal input to the optical modulator is controlled properly. Accordingly, there exist problems below in a configuration in which an optical signal is remodulated between an optical transmitter and an optical receiver.

(1) The cost is increased if a polarization controller is provided at an input side of the optical modulator.

(2) A method for processing a polarization multiplexed optical signal is not obvious.

(3) It is difficult to collectively process a plurality of optical signals when not all of the polarization states of the optical signals in a wavelength division multiplexed optical signal are the same.

Further, in a configuration in which a supervisory signal is superimposed, for example, by frequency modulation, on an optical signal that transmits a main signal, a method for processing the supervisory signal without converting the optical signal into an electric signal is unknown.

As described above, there exist problems to be solved in the method for remodulating an optical signal that is propagated in an optical network.

SUMMARY

According to an aspect of the embodiments, an optical remodulator includes: a polarization diversity modulator configured to modulate an input optical signal to generate an output optical signal by using a first optical modulator implemented for a first polarization state and a second optical modulator implemented for a second polarization state that is orthogonal to the first polarization state; a photo detector configured to optical-to-electrical convert the input optical signal or the output optical signal or both of the optical signals into an electric signal; and a drive signal generator configured to generate a first drive signal that drives the first optical modulator and a second drive signal that drives the second optical modulator based on the electric signal generated by the photo detector.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 3A and 3B illustrate examples of configurations of a parallel-type polarization diversity modulator;

FIGS. 5A and 5B illustrate examples of configurations of a serial-type polarization diversity modulator;

FIGS. 6A and 6B illustrate examples of configurations of circuit for detecting an optical signal;

FIGS. 7A and 7B illustrate other examples of configurations of a circuit for detecting an optical signal;

FIG. 8 illustrates an example of a transmission system in which an optical remodulator according to a first embodiment is used;

FIGS. 12A-12C are diagrams that explain a frequency shift of an optical signal;

FIGS. 14A and 14B illustrate examples of an optical transmitter that generates a dual-modulated optical signal;

FIGS. 16A and 16B are diagrams that explain a detection of a frequency modulated signal;

FIG. 18 illustrates an example of rewriting of a supervisory signal.

DESCRIPTION OF EMBODIMENTS

Figure 1:
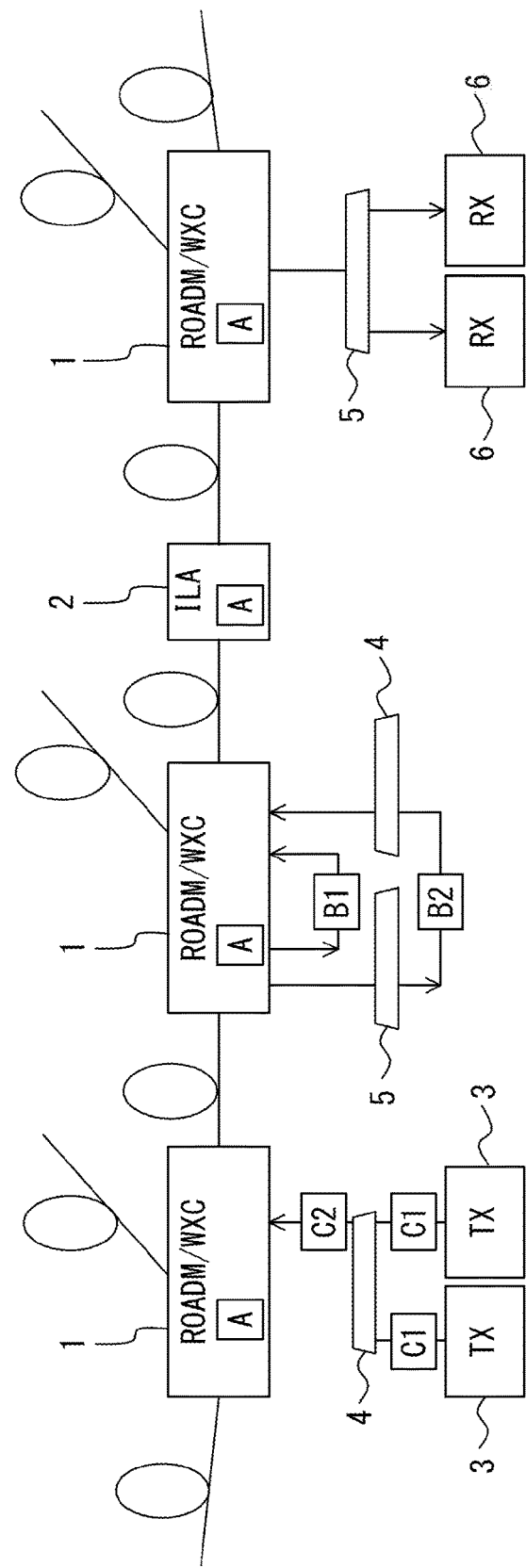
FIG. 1 illustrates an example of an optical network in which an optical remodulator is used.

FIG. 1 illustrates an example of an optical network in which an optical remodulator according to embodiments of the present invention is used. In the optical network of FIG. 1, a node device 1 is, for example, an optical add-drop multiplexer (ROADM: Reconfigurable Optical Add Drop Multiplexer) or a wavelength crossconnect (WXC: Wavelength Cross Connect), and transmits a WDM optical signal. An in-line amplifier (ILA) 2 is provided, as needed, on an optical transmission link that connects nodes. An optical transmitter (TX) 3 generates an optical signal and transmits it to a destination. A multiplexer 4 multiplexes a plurality of optical signals of different wavelengths. A demultiplexer 5 separates, for each wavelength, a multiplexed optical signal in which a plurality of optical signals are multiplexed. An optical receiver (RX) 6 receives an optical signal. The "optical signal" refers to a signal that passes through an identical transmission medium and is treated as a unit of switching upon a route is switched in a ROADM or a WXC, and the "optical signal" is not always a signal generated physically based on a single light source. In other words, one optical signal may be a multicarrier signal (which may be referred to as a superchannel) that is generated from a plurality of subcarriers having different frequencies.

A, B1, B2, C1, and C2 illustrated in FIG. 1 represent positions at which an optical remodulator may be implemented. An optical remodulator implemented at the position A collectively remodulates a plurality of optical signals multiplexed in a wavelength division multiplexed optical signal (hereinafter referred to as a WDM optical signal). (However, depending on a situation, the number of optical signals transmitted through this position may be one, and in this case, the number of optical signals to be remodulated is one.) Optical remodulators implemented at the positions B1 and B2 respectively remodulate a portion of a plurality of optical signals multiplexed in a WDM optical signal. The remodulator implemented at the position B1 is able to collectively remodulate a plurality of optical signals. The remodulator implemented at the position B2 remodulates one optical signal. Optical remodulators implemented at the positions C1 and C2 respectively remodulate an optical signal output from a corresponding optical transmitter 3 and optical signals output from optical transmitters 3. The optical remodulator implemented at the position C1 remodulates one optical signal output from one optical transmitter 3. The optical remodulator implemented at the position C2 is able to collectively remodulate a plurality of optical signals multiplexed by the multiplexer 4.

Figure 2A:
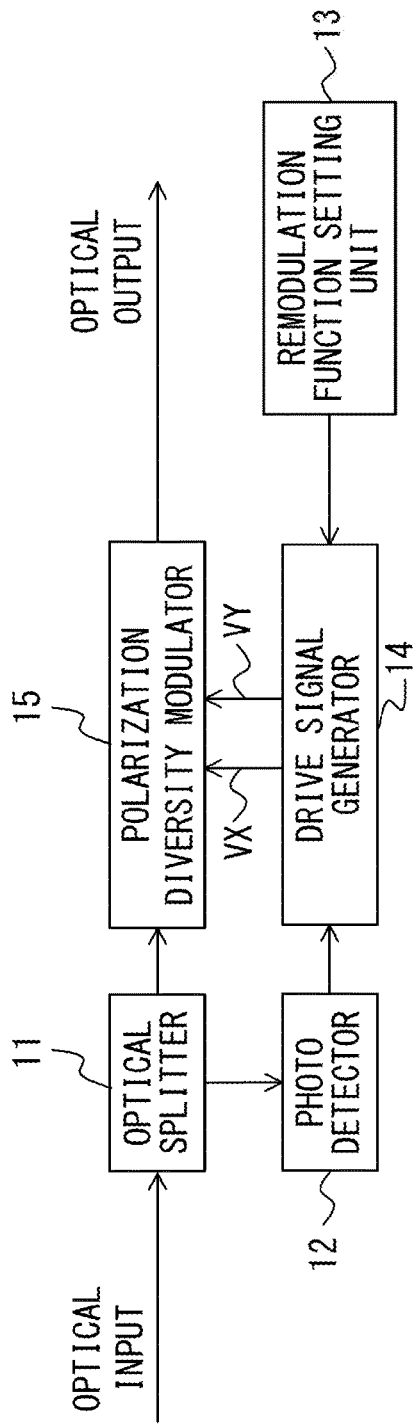
FIGS. 2A and 2B illustrate examples of configurations of the optical remodulator.
Figure 2B:
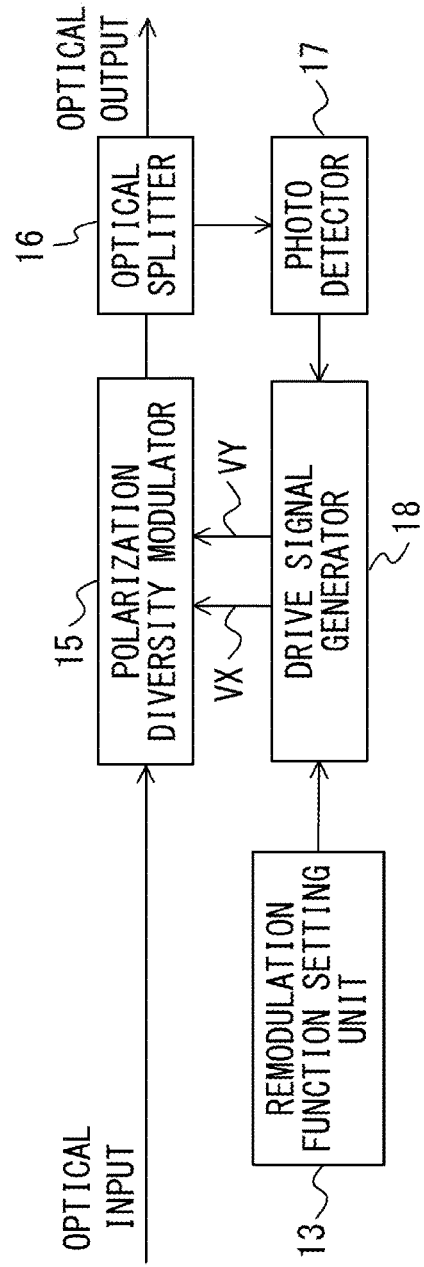

FIGS. 2A and 2B illustrate examples of configurations of the optical remodulator according to the embodiments of the present invention. The optical remodulator may be configured such that a WDM optical signal is input or such that an optical signal of a certain wavelength may be input. Further, a polarization multiplexed optical signal is input to the optical remodulator. However, the optical remodulator may be configured such that a single-polarization optical signal is input.

FIG. 2A illustrates an example of the optical remodulator which performs remodulation with feedforward control. In this case, the optical remodulator includes an optical splitter 11, a photo detector 12, a remodulation function setting unit 13, a drive signal generator 14, and a polarization diversity modulator 15.

The optical splitter 11 splits an optical signal to be input to the polarization diversity modulator 15 and guides an optical signal to the photo detector 12. The photo detector 12 converts the optical signal guided from the optical splitter 11 into an electric signal. In other words, the photo detector 12 outputs the electric signal that indicates the optical signal to be input to the polarization diversity modulator 15. The remodulation function setting unit 13 gives, to the drive signal generator 14, an instruction that indicates a remodulation function provided by the optical remodulator. The optical remodulator can provide, for example, some of or all of the following functions.

(1) Mitigate a waveform distortion due to nonlinear effects in an optical fiber.
(2) RZ-pulse generation for an optical signal with a clock signal synchronized with a data signal.
(3) Shift a frequency of an optical signal or frequencies of a plurality of optical signals in a WDM optical signal.
(4) Update or delete a supervisory signal superimposed on an optical signal.

The remodulation function provided by the optical remodulator is specified, for example, by a user or a network administrator.

The drive signal generator 14 generates drive signals VX and VY according to the electric signal output from the photo detector 12. At this point, the drive signal generator 14 generates the drive signals VX and VY according to the instruction given by the remodulation function setting unit 13.

The polarization diversity modulator 15 includes two optical modulators X and Y that respectively correspond to polarization states X and Y that are orthogonal to each other. The optical modulator X performs modulation with respect to an input optical signal according to the drive signal VX, and the optical modulator Y performs modulation with respect to the input optical signal according to the drive signal VY. The drive signal VX is mainly or exclusively used to perform modulation with respect to the polarization state X, and the drive signal VY is mainly or exclusively used to perform modulation with respect to the polarization state Y. Note that the polarization diversity modulator 15 modulates at least one of an amplitude, a phase, and a frequency of the input optical signal according to the drive signal VX or VY, so as to generate an output optical signal.

FIG. 2B illustrates an example of the optical remodulator which performs remodulation with feedback control. In this case, the optical remodulator includes an optical splitter 16, a photo detector 17, the remodulation function setting unit 13, a drive signal generator 18, and the polarization diversity modulator 15. The remodulation function setting unit 13 and the polarization diversity modulator 15 are substantially the same in FIGS. 2A and 2B, so the descriptions will be omitted.

The optical splitter 16 splits an optical signal output from the polarization diversity modulator 15 (that is, a remodulated optical signal), and guides the optical signal to the photo detector 17. The photo detector 17 converts the optical signal guided from the optical splitter 16 into an electric signal. In other words, the photo detector 17 outputs an electric signal that indicates the optical signal output from the polarization diversity modulator 15. The drive signal generator 18 generates drive signals VX and VY according to the electric signal output from the photo detector 17. At this point, the drive signal generator 18 generates the drive signals VX and VY according to the instruction given by the remodulation function setting unit 13.

Compared with the feedforward system, the feedback system is disadvantageous in achieving a wider modulation bandwidth (that is, an increase in modulation speed) because a control loop is likely to be greatly delayed in the feedback system. However, in the feedback system, a drive signal is generated according to the output of the polarization diversity modulator 15, so it is possible to achieve a more accurate modulation operation. For example, a remodulation much closer to a desired operation may be achieved by compensating for the uncertainty due to, for example, a variation in the amplitude and/or the phase of drive signals VX and VY. On the other hand, in the feedforward system, it is easy to achieve a wider modulation bandwidth, but there is a possibility that the accuracy of modulation will be made lower than that in the feedback system. Thus, it is preferable that the feedforward system or the feedback system be selected properly according to, for example, a modulation rate of an optical signal and required functions.

In the remodulator illustrated in FIG. 2A, a delay line that causes an appropriate delay may be provided between the optical splitter 11 and the polarization diversity modulator 15. In this case, when a delay amount in the delay line is appropriate, it is possible to further increase a speed of a modulation operation.

FIGS. 3A and 3B illustrate examples of configurations of the polarization diversity modulator. In each of the polarization diversity modulators in FIGS. 3A and 3B, two optical modulators are arranged in parallel. Thus, the configurations illustrated in FIGS. 3A and 3B may hereinafter be referred to as a "parallel type".

In the example of FIG. 3A, the polarization diversity modulator 15 includes a polarization beam splitter (PBS) 21, optical modulators 22 and 23, and a polarization beam combiner (PBC) 24. The polarization beam splitter 21 separates an input optical signal into an optical signal X and an optical signal Y. The polarization of the optical signal X and the polarization of the optical signal Y are orthogonal to each other. The optical signal X is guided to the optical modulator 22, and the optical signal Y is guided to the optical modulator 23.

The optical modulator 22 modulates the optical signal X according to a drive signal VX. Likewise, the optical modulator 23 modulates the optical signal Y according to a drive signal VY. In this case, the optical modulators 22 and 23 respectively have eigenstates. In other words, the optical modulators 22 and 23 are each able to perform a suitable modulation when an input light has a specified polarization state. In this example, it is assumed that the optical modulator 22 is able to modulate input light in a TE mode efficiently, and the optical modulator 23 is able to modulate input light in a TM mode efficiently. In this case, the polarization beam splitter 21 generates the optical signal X and the optical signal Y such that the optical signal X is input to the optical modulator 22 in a TE mode, and such that the optical signal Y is input to the optical modulator 23 in a TM mode.

Figure 4A:
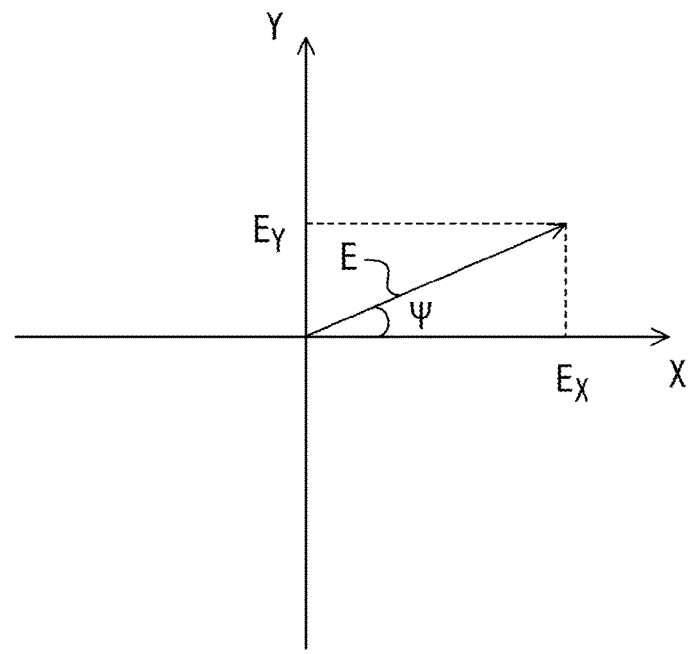
FIGS. 4A and 4B are diagrams that explain operations of a polarization diversity modulator.
Figure 4B:
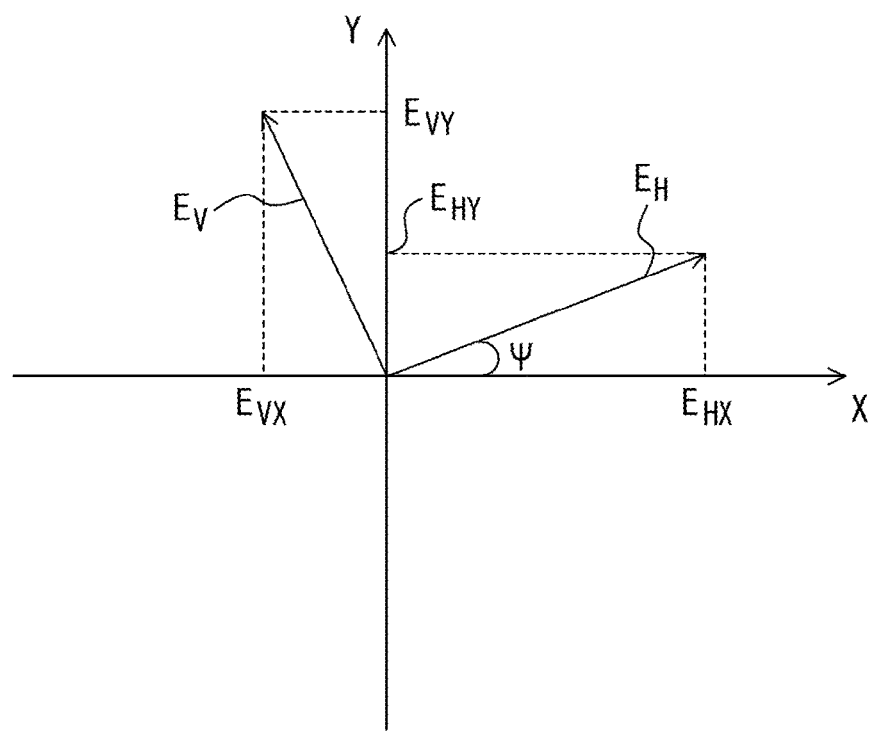

FIGS. 4A and 4B are diagrams that explain operations of the polarization diversity modulator 15. In FIGS. 4A and 4B, an X-axis and a Y-axis respectively represent polarization axis of the polarization beam splitter 21. E represents a polarization state of an input optical signal. However, the polarization state of an optical signal varies on an optical transmission link. Thus, the polarization state of an optical signal to be input to the polarization diversity modulator 15 is unknown. In the examples of FIGS. 4A and 4B, an optical signal E that has a polarization state rotated by an angle with respect to the X-axis of the polarization beam splitter 21 is input to the polarization diversity modulator 15.

As described above, the input optical signal E is separated by the polarization beam splitter 21 into an optical signal X and an optical signal Y. Thus, as illustrated in FIG. 4A, the input optical signal E is separated into a polarization component $E_X$ and a polarization component $E_Y$. The polarization component $E_X$ and the polarization component $E_Y$ correspond to the optical signal X and the optical signal Y, respectively. Further, the polarization component $E_X$ and the polarization component $E_Y$ are guided to the optical modulator 22 and the optical modulator 23, respectively. Thus, the polarization component $E_X$ is modulated in the optical modulator according to a drive signal VX, and the polarization component $E_Y$ is modulated in the optical modulator 23 according to a drive signal VY. In other words, the input optical signal E is separated into the polarization component $E_X$ and the polarization component $E_Y$, and the polarization component $E_X$ and the polarization component $E_Y$ are modulated by the optical modulators 22 and 23, respectively. After that, the modulated polarization component $E_X$ and the modulated polarization component $E_Y$ are combined by the polarization beam combiner 24.

In the example of FIG. 3A, the eigen polarization state of the optical modulator 22 is a TE polarization, and the polarization component $E_X$ is input into the optical modulator 22 in a TE mode. Further, the eigen polarization state of the optical modulator 23 is a TM polarization, and the polarization component $E_Y$ is input into the optical modulator 23 in a TM mode. Thus, the polarization component $E_X$ and the polarization component $E_Y$ are respectively modulated in the optical modulators 22 and 23 with high efficiency. In other words, no matter what state the polarization of an input optical signal is in, the polarization diversity modulator 15 is able to modulate the optical signal with high efficiency.

When the polarization angle ψ is close to zero, the input optical signal E is modulated mainly by the optical modulator 22. Further, when the polarization angle ψ is close to π/2, the input optical signal E is modulated mainly by the optical modulator 23. Furthermore, when the polarization angle ψ is close to π/4, the input optical signal E is nearly evenly modulated by the optical modulators 22 and 23.

When a polarization multiplexed optical signal is input to the polarization diversity modulator 15, each optical signal in the polarization multiplexed optical signal is separated into a polarization component $E_X$ and a polarization component $E_Y$, as illustrated in FIG. 4B. In this example, the input polarization multiplexed optical signal includes an optical signal $E_H$ and an optical signal $E_V$. The polarization of the optical signal $E_H$ and the polarization of the optical signal $E_V$ are orthogonal to each other. In this case, the optical signal $E_H$ is separated into a polarization component $E_{HX}$ and a polarization component $E_{HY}$, and the polarization component $E_{HX}$ and the polarization component $E_{HY}$ are guided to the optical modulators 22 and 23, respectively. Likewise, the optical signal $E_V$ is separated into a polarization component $E_{VX}$ and a polarization component $E_{VY}$, and the polarization component $E_{VX}$ and the polarization component $E_{VY}$ are guided to the optical modulators 22 and 23, respectively. Then, the optical modulator 22 modulates the polarization components $E_{HX}$ $E_{VX}$ according to the drive signal VX. Further, the optical modulator 23 modulates the polarization components $E_{HY}$ $E_{VY}$ according to the drive signal VY. Thus, even when the input optical signal is a polarization multiplexed optical signal, the polarization diversity modulator 15 is able to modulate the polarization multiplexed optical signal with high efficiency.

When the input optical signal is a WDM optical signal, each optical signal in the WDM optical signal is separated as illustrated in FIG. 4A or 4B, and modulations are performed in the optical modulators 22 and 23. Thus, even when the polarization state of each optical signal in the WDM optical signal is unknown, the polarization diversity modulator 15 is able to modulate each of these optical signals with high efficiency. In other words, even though not all of the polarization states of the optical signals in the WDM optical signal are the same, each of the optical signals is modulated with high efficiency.

In the example of FIG. 3B, the polarization diversity modulator 15 includes a polarization rotator 25 in addition to the polarization beam splitter 21, the optical modulators 22 and 23, and the polarization beam combiner 24. The polarization rotator 25 rotates the polarization of the optical signal Y by 90 degrees between the polarization beam splitter 21 and the optical modulator 23. The polarization rotator 25 can be realized by a passive element. For example, when the PBS 21 and the optical modulator 23 are connected using a polarization maintaining optical fiber, the polarization rotator 25 may be realized by adjusting an eigen polarization axis of the fiber by 90 degrees.

In the example of FIG. 3B, the optical modulators 22 and 23 have substantially the same characteristics. For example, it is assumed that both of the optical modulators 22 and 23 modulate an input light in a TE mode efficiently. In this case, the polarization beam splitter 21 generates the optical signal X and the optical signal Y such that the optical signal X is input to the optical modulator 22 in a TE mode. At this time, the optical signal Y is output from the polarization beam splitter 21 in a TM mode. However, the polarization of the optical signal Y is rotated by the polarization rotator 25 by 90 degrees. Thus, the optical signal Y is also input to the optical modulator 23 in a TE mode.

As described above, as is the case with the configuration of FIG. 3A, an input optical signal is separated into polarization components that are orthogonal to each other in the configuration of FIG. 3B. Here, each of the polarization components is generated so as to match the eigen polarization state of a corresponding optical modulator. Alternatively, each of the polarization components is controlled so as to match the eigen polarization state of the corresponding optical modulator. Thus, also in the configuration of FIG. 3B, the polarization diversity modulator 15 is able to modulate an optical signal of an arbitrary polarization state with high efficiency, and is able to modulate a polarization multiplexed optical signal with high efficiency.

In the configurations of FIGS. 3A and 3B, with respect to two routes through which the optical signal X and the optical signal Y respectively transmitted from the polarization beam splitter 21 to the polarization beam combiner 24, it is ideal if their lengths of an optical path are identical to each other, but they do not always have to be made identical. The difference in the length of an optical path may be equivalent to a polarization mode dispersion on a transmission route from an optical transmitter to an optical receiver, and thus it does not matter if the difference is within an allowable amount in a system design.

FIGS. 5A and 5B illustrate other examples of configurations of the polarization diversity modulator. In each of the polarization diversity modulators in FIGS. 5A and 5B, two optical modulators are arranged in series. Thus, the configurations of FIGS. 5A and 5B may hereinafter be referred to as a "serial type".

In the example of FIG. 5A, the polarization diversity modulator 15 includes an optical modulator 41, a polarization rotator 43, and an optical modulator 42. In this example, the optical modulators 41 and 42 have the same characteristics. For example, it is assumed that each of the optical modulators 41 and 42 is able to modulate light in a TE mode efficiently.

The optical modulator 41 modulates an input optical signal according to a drive signal VX. The polarization rotator 43 rotates, by 90 degrees, the polarization of an optical signal output from the optical modulator 41. The optical modulator 42 modulates an optical signal output from the polarization rotator 43 according to the drive signal VY.

Here, an operation of the polarization diversity modulator 15 of FIG. 5A is described with reference to FIG. 4A. It is assumed that the X-axis represents a direction of an eigen polarization state of the optical modulator 41. In this case, when the optical signal E is input to the polarization diversity modulator 15, the polarization component $E_X$ is mainly modulated according to the drive signal VX in the optical modulator 41. The polarization of an optical signal output from the optical modulator 41 is rotated by the polarization rotator 43 by 90 degrees. In other words, the polarization component $E_Y$ is controlled so as to match an eigen polarization state of the optical modulator 42. Thus, the polarization component $E_Y$ is mainly modulated according to drive signal VY in the optical modulator 42. Therefore, polarization component $E_X$ is efficiently modulated in the optical modulator 41, and the polarization component $E_Y$ is efficiently modulated in the optical modulator 42, with the result that the input optical signal E is modulated efficiently.

In the example of FIG. 5B, the polarization diversity modulator 15 includes the optical modulator 41 and the optical modulator 42. In this example, the optical modulators 41 and 42 have different characteristics from each other. For example, it is assumed that the optical modulator 41 modulates light in a TE mode efficiently and the optical modulator 42 modulates light in a TM mode efficiently.

In this configuration, the optical modulator 41 mainly modulates the polarization component $E_X$ according to the drive signal VX. Further, the optical modulator 42 mainly modulates the polarization component $E_Y$ according to the drive signal VY. In other words, the polarization diversity modulators of FIGS. 5A and 5B perform substantially the same modulation.

In the configurations of FIGS. 5A and 5B, there exists a time difference specific to a serial-type between the timing at which an input optical signal is modulated by the optical modulator 41 and the timing at which the input optical signal is modulated by the optical modulator 42. When a high-speed remodulation is realized by the serial-type configuration, the accuracy of modulation may be improved by providing a relative delay between the drive signal VX and the drive signal VY in proper consideration of this time difference.

As described above, in the serial-type polarization diversity modulator of FIG. 5A or 5B, a portion of polarization components of an input optical signal (in this case, a polarization component that matches the eigen polarization state of the optical modulator 41) is mainly modulated in the optical modulator 41, and the other polarization component is mainly modulated in the optical modulator 42. Thus, the parallel-type polarization diversity modulator of FIG. 3A or 3B and the serial-type polarization diversity modulator of FIG. 5A or 5B can perform substantially the same modulation.

Further, in both of the parallel-type and the serial-type configurations, the polarization diversity modulator has two eigen polarization states that are orthogonal to each other. Here, the "eigen polarization state" refers to an input polarization state in which each of an optical modulator driven by the drive signal VX (the optical modulator 22 or the optical modulator 41) and an optical modulator driven by the drive signal VY (the optical modulator 23 or the optical modulator 42) is able to perform an efficient modulation. For example, in the configuration of FIG. 3A, one of the eigen polarization states is provided by the optical modulator 22, and the other eigen polarization state is provided by the optical modulator 23. In the configuration of FIG. 3B, one of the eigen polarization states is provided by the optical modulator 22, and the other eigen polarization state is provided by the polarization rotator 25 and the optical modulator 23. Thus, in the configurations of FIGS. 3A and 3B, an input optical signal is separated by the polarization beam splitter 21 into polarization components that respectively correspond to the two eigen polarization states described above. Further, in the configuration of FIG. 5A, one of the eigen polarization states is provided by the optical modulator 41, and the other eigen polarization state is provided by the polarization rotator 43 and the optical modulator 42. In the configuration of FIG. 5B, one of the eigen polarization states is provided by the optical modulator 41, and the other eigen polarization state is provided by the optical modulator 42.

As described above, the polarization diversity modulator 15 may have a parallel-type configuration or a serial-type configuration. The parallel-type has the following advantages.

(1) OIF standard components may be easily applied to the polarization diversity modulator 15. (Implementation Agreement for Integrated Polarization Multiplexed Quadrature Modulated Transmitters, http://www.oiforum.com/wp-content/uploads/OIF-PMQ-TX-01.2-IA.pdf)

(2) The length from an input end to an output end of the polarization diversity modulator 15 can be made shorter.

On the other hand, the serial-type has the following advantages.

(1) Light loss is small.

(2) The polarization diversity modulator 15 can be made narrower.

(3) The polarization diversity modulator 15 can be configured by fewer components.

Next, configurations for detecting an input optical signal and/or an output optical signal of the polarization diversity modulator 15 are described. FIGS. 6A and 6B illustrate examples of configurations for detecting an optical signal in the parallel-type polarization diversity modulator. FIGS. 7A and 7B illustrate examples of configurations for detecting an optical signal in the serial-type polarization diversity modulator.

In the parallel-type, when drive signals VX and VY used for realizing a remodulation performed with feedforward control are generated, an optical splitter 26 and a photo detector 27 are provided at an input side of the polarization diversity modulator 15, as illustrated in FIG. 6A. The optical splitter 26 splits an optical signal to be input to the polarization diversity modulator 15 and guides an input optical signal to the photo detector 27. The photo detector 27 converts, into an electric signal, the input optical signal guided from the optical splitter 26. The electric signal generated by the photo detector 27 is guided to a drive signal generator that generates the drive signals VX and VY.

When drive signals VX and VY used for realizing a remodulation performed with feedback control are generated, an optical splitter 28 and a photo detector 29 are provided at an output side of the polarization diversity modulator 15. The optical splitter 28 splits an optical signal output from the polarization diversity modulator 15, and guides the optical signal to the photo detector 29. The photo detector 29 converts, into an electric signal, the output optical signal guided from the optical splitter 28. The electric signal generated by the photo detector 29 is guided to the drive signal generator that generates the drive signals VX and VY.

The optical remodulator may generate drive signals VX and VY according to both an input optical signal and an output optical signal of the polarization diversity modulator 15. In this case, the optical remodulator includes the optical splitters 26 and 28 and the photo detectors 27 and 29.

In the configuration of FIG. 6B, optical signals are detected with respect to two polarization states that are orthogonal to each other. Specifically, two polarization components that respectively correspond to polarization axes of the polarization beam splitter 21 are detected individually.

When drive signals VX and VY used for realizing a remodulation performed with feedforward control are generated, an optical splitter 31 and a photo detector 33 are provided at an input side of the optical modulator 22, and an optical splitter 32 and a photo detector 34 are provided at an input side of the optical modulator 23. The optical splitter 31 splits an optical signal X and guides the optical signal X to the photo detector 33, and the optical splitter 32 splits an optical signal Y and guides the optical signal Y to the photo detector 34. The photo detector 33 converts, into an electric signal, the optical signal X guided from the optical splitter 31, and the photo detector 34 converts, into an electric signal, the optical signal Y guided from the optical splitter 32. The electric signals generated by the photo detectors 33 and 34 are guided to the drive signal generator that generates the drive signals VX and VY.

When drive signals VX and VY used for realizing a remodulation performed with feedback control are generated, an optical splitter 35 and a photo detector 37 are provided at an output side of the optical modulator 22, and an optical splitter 36 and a photo detector 38 are provided at an output side of the optical modulator 23. The optical splitter 35 splits an optical signal output from the optical modulator 22 and guides the optical signal to the photo detector 37, and the optical splitter 36 splits an optical signal output from the optical modulator 23 and guides the optical signal to the photo detector 38. The photo detector 37 converts, into an electric signal, the optical signal guided from the optical splitter 35, and the photo detector 38 converts, into an electric signal, the optical signal guided from the optical splitter 36. The electric signals generated by the photo detectors 37 and 38 are guided to the drive signal generator that generates the drive signals VX and VY.

The optical remodulator may generate drive signals VX and VY according to both an input optical signal and an output optical signal of each of the optical modulators 22 and 23. In this case, the optical remodulator includes the optical splitters 31, 32, 35 and 36, and the optical receivers 33, 34, 37 and 38.

In the serial-type, when drive signals VX and VY used for realizing a remodulation performed with feedforward control are generated, an optical splitter 44 and a photo detector 45 are provided at an input side of the polarization diversity modulator 15, as illustrated in FIG. 7A. The optical splitter 44 splits an optical signal to be input to the polarization diversity modulator 15 and guides the optical signal to the photo detector 45. The photo detector 45 converts, into an electric signal, the input optical signal guided from the optical splitter 44. The electric signal generated by the photo detector 45 is guided to a drive signal generator that generates the drive signals VX and VY.

When drive signals VX and VY used for realizing a remodulation performed with feedback control are generated, an optical splitter 46 and a photo detector 47 are provided at an output side of the polarization diversity modulator 15. The optical splitter 46 splits an optical signal output from the polarization diversity modulator 15, and guides the optical signal to the photo detector 47. The photo detector 47 converts, into an electric signal, the output optical signal guided from the optical splitter 46. The electric signal generated by the photo detector 47 is guided to the drive signal generator that generates the drive signals VX and VY.

An optical signal may be tapped between the optical modulator 41 and the optical modulator 42. For example, an optical splitter 48 splits an optical signal output from the optical modulator 41 and guides the optical signal to an photo detector 49. The photo detector 49 converts, into an electric signal, the optical signal guided from the optical splitter 48.

In the configuration of FIG. 7B, optical signals are detected with respect to two polarization states that are orthogonal to each other. Specifically, a first polarization component that corresponds to an eigen polarization state of the optical modulator 41 and a second polarization component that is orthogonal to the first polarization component are detected.

When drive signals VX and VY used for realizing a remodulation performed with feedforward control are generated, the optical splitter 44, a polarization beam splitter 51, and photo detectors 52 and 53 are provided at an input side of the polarization diversity modulator 15. The optical splitter 44 splits an optical signal to be input to the polarization diversity modulator 15 and guides the optical signal to the polarization beam splitter 51. The polarization beam splitter 51 splits the optical signal received from the optical splitter 44 into polarization components that are orthogonal to each other and guides the polarization components to the photo detectors 52 and 53. The photo detectors 52 and 53 respectively convert, into electric signals, the optical signals received from the polarization beam splitter 51. Here, the polarization beam splitter 51 preferably splits the optical signal received from the optical splitter 44 into an eigen polarization state of the optical modulator 41 and a polarization state that is orthogonal to the eigen polarization state of the optical modulator 41. Then, an electric signal that indicates a polarization component that is strongly modulated in the optical modulator 41 is generated by the photo detector 52, and an electric signal that indicates a polarization component that is strongly modulated in the optical modulator 42 is generated by the photo detector 53.

When drive signals VX and VY used for realizing a remodulation performed with feedback control are generated, the optical splitter 46, a polarization beam splitter 54, and photo detectors 55 and 56 are provided at an output side of the polarization diversity modulator 15. The optical splitter 46 splits an optical signal output from the polarization diversity modulator 15 and guides the optical signal to the polarization beam splitter 54. The polarization beam splitter 54 splits the optical signal received from the optical splitter 46 into polarization components that are orthogonal to each other and guides the polarization components to the photo detectors 55 and 56. The photo detectors 55 and 56 respectively convert, into electric signals, the optical signals received from the polarization beam splitter 54. Here, the polarization beam splitter 54 preferably splits the optical signal received from the optical splitter 46 into an eigen polarization state of the optical modulator 41 and a polarization state that is orthogonal to the eigen polarization state of the optical modulator 41. Then, an electric signal that indicates a polarization component that is strongly modulated in the optical modulator 41 is generated by the photo detector 55, and an electric signal that indicates a polarization component that is strongly modulated in the optical modulator 42 is generated by the photo detector 56.

An optical signal may be tapped between the optical modulator 41 and the optical modulator 42. For example, the optical splitter 48 splits the optical signal output from the optical modulator 41 and guides the optical signal to a polarization beam splitter 57. The polarization beam splitter 57 splits the optical signal received from the optical splitter 48 into polarization components that are orthogonal to each other and guides the polarization components to photo detectors 58 and 59. Then, the photo detectors 58 and 59 respectively convert, into electric signals, the optical signals received from the polarization beam splitter 57.

An optical module implemented with the polarization diversity modulator 15 may be configured to include the photo detectors illustrated in FIG. 6A, 6B, 7A, or 7B. This provides an advantage in downsizing an optical remodulator. Further, the photo detectors illustrated in FIG. 6A, 6B, 7A, or 7B may be provided outside the optical module implemented with the polarization diversity modulator 15. According to this configuration, a photo detector and an optical modulator can be easily optimized individually.

<First Embodiment>

In a first embodiment, an optical remodulator remodulates an optical signal in order to mitigate a waveform distortion due to nonlinear effects that occur in an optical fiber. For example, in a WDM transmission system, the optical remodulator remodulates a WDM optical signal on a transmission link so as to suppress a cross-phase modulation (XPM: cross-phase modulation) between wavelength channels.

FIG. 8 illustrates an example of a transmission system in which an optical remodulator according to the first embodiment is used. In the example of FIG. 8, a WDM optical signal is transmitted from a transmitter Tx to a receiver Rx through an optical fiber cable. A plurality of wavelength channels are multiplexed in the WDM optical signal. In other words, a plurality of optical signals of different wavelengths are transmitted from the transmitter Tx to the receiver Rx.

An optical remodulator 100 is provided on an optical transmission link between the transmitter Tx and the receiver Rx. A plurality of optical remodulators 100 may be provided according to the transmission distance between the transmitter Tx and the receiver Rx. In the example of FIG. 1, the optical remodulator 100 may be arranged in the position A. In other words, the optical remodulator 100 is provided in, for example, a ROADM node, a WXC node, or an ILA node.

Figure 9:
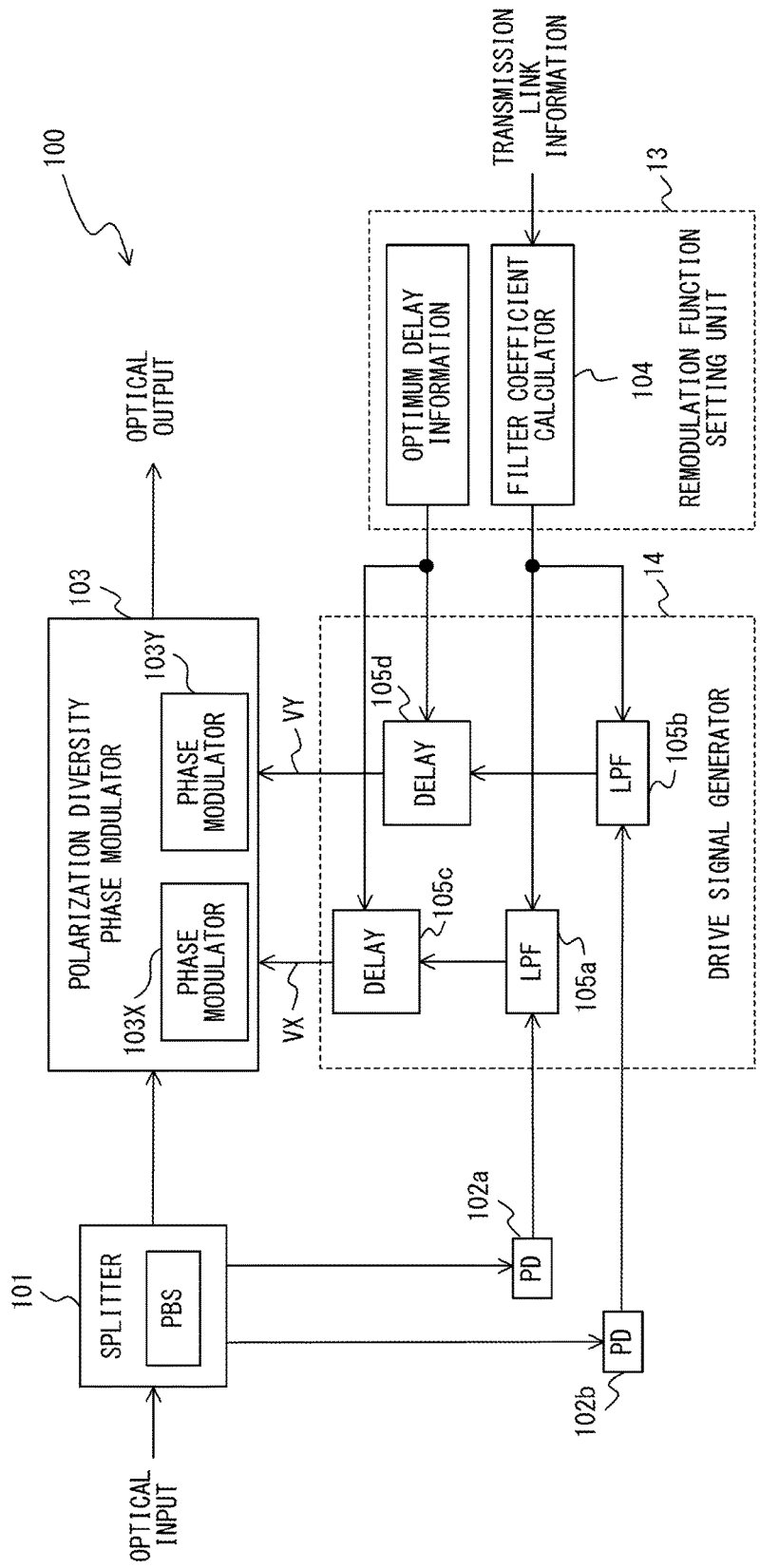
FIG. 9 illustrates an example of an optical remodulator of the first embodiment.

FIG. 9 illustrates an example of the optical remodulator 100 according to the first embodiment. As illustrated in FIG. 9, the optical remodulator 100 includes an optical splitter 101, photo detectors 102a and 102b, the remodulation function setting unit 13, the drive signal generator 14, and a polarization diversity phase modulator 103. The polarization diversity phase modulator 103 may be configured in the parallel-type illustrated in FIG. 3A or 3B, or the serial-type illustrated in FIG. 5A or 5B. In the following descriptions, it is assumed that the polarization diversity phase modulator 103 is configured in the parallel-type illustrated in FIG. 3A or 3B.

A WDM optical signal is input to the optical remodulator 100. The input WDM optical signal is guided to the optical splitter 101. The optical splitter 101 includes a polarization beam splitter and separates the input WDM optical signal into a set of optical signals of polarization states that are orthogonal to each other. For example, when a polarization diversity modulator is realized by the configuration of FIG. 6B, the optical splitter 101 corresponds to the polarization beam splitter 21, and the optical splitters 31 and 32. In this case, the optical splitter 101 generates an optical signal X and an optical signal Y from the input WDM optical signal. Each of the optical signal X and the optical signal Y is a WDM optical signal. Then, the optical splitter 101 guides the optical signals X and Y to the polarization diversity phase modulator 103, and guides the optical signals X and Y to the photo detectors 102a and 102b, respectively. The photo detectors 102a and 102b respectively convert the optical signals X and Y into electric signals.

The polarization diversity phase modulator 103 includes two phase modulators 103X and 103Y that respectively correspond to eigen polarization states X and Y that are orthogonal to each other. In the example of FIG. 3A or 3B, the phase modulators 103X and 103Y correspond to the optical modulators 22 and 23, respectively. In other words, the optical signal X generated from the input WDM optical signal is input to the phase modulator 103X, and the optical signal Y generated from the input WDM optical signal is input to the phase modulator 103Y. The optical signal Y may be input to the phase modulator 103Y after the polarization state is controlled by the polarization rotator 25 illustrated in FIG. 3B.

Thus, the electric signal generated by the photo detector 102a indicates the optical signal X that is guided to the phase modulator 103X. Similarly, the electric signal generated by the photo detector 102b indicates the optical signal Y that is guided to the phase modulator 103Y.

The remodulation function setting unit 13 includes a filter coefficient calculator 104. The filter coefficient calculator 104 calculates, according to transmission link information, filter coefficients used in the drive signal generator 14. The transmission link information includes, for example, a length of an optical transmission link over which a WDM optical signal is transmitted and a parameter that represents the characteristics of an optical fiber that transmits the WDM optical signal. Further, optimum delay information that represents a delay amount of a variable delay 105c, 105d described later is stored in a memory included in the remodulation function setting unit 13.

The drive signal generator 14 includes low pass filters (LPF) 105a and 105b, and the variable delays 105c and 105d. The low pass filter 105a filters the electric signal generated by the photo detector 102a using filter coefficients provided by the remodulation function setting unit 13, and generates a drive signal VX. Likewise, the low pass filter 105b filters the electric signal generated by the photo detector 102b using filter coefficients provided by the remodulation function setting unit 13, and generates a drive signal VY. Here, the low pass filters 105a and 105b have substantially the same configuration. Further, the same filter coefficients are provided to the low pass filters 105a and 105b. An example of the filter coefficients will be described later.

The drive signals VX and VY respectively generated by the low pass filters 105a and 105b are respectively delayed by the variable delays 105c and 105d. The delay amounts of the variable delays 105c and 105d are provided by the remodulation function setting unit 13. In this case, if a relative delay (that is, a skew) between drive signals VX and VY is adjusted accurately, a cross-phase modulation may be accurately cancelled in the polarization diversity phase modulator 103. Thus, when the optical remodulator 100 is manufactured, the delay amounts of the variable delays 105c and 105d are measured in advance such that a skew between drive signals VX and VY is made smaller, and a result of the measurement is stored in the remodulation function setting unit 13 as optimum delay information.

In the configuration in which the phase modulators 103X and 103Y are arranged in parallel, the delay amounts of the variable delays 105c and 105d may be determined such that a skew between drive signals VX and VY becomes zero. Further, in the configuration in which the phase modulators 103X and 103Y are arranged in series, the delay amounts of the variable delays 105c and 105d may be determined such that a skew between drive signals VX and VY matches a delay time between the phase modulator 103X and the phase modulator 103Y.

The polarization diversity phase modulator 103 modulates an input optical signal with drive signals VX and VY so as to generate an output optical signal. Specifically, the phase modulator 103X modulates an input optical signal with the drive signal VX, and the phase modulator 103Y modulates the input optical signal with the drive signal VY. For example, in the configuration in which the phase modulator 103X and the phase modulator 103Y are arranged in parallel, the phase modulator 103X modulates, with the drive signal VX, an optical signal X obtained from an input WDM optical signal, and the phase modulator 103Y modulates, with the drive signal VY, an optical signal Y obtained from the input WDM optical signal. Then, output optical signals of the phase modulators 103X and 103Y are combined by a polarization beam combiner. As a result, a cross-phase modulation of each optical signal in the WDM optical signal is cancelled or suppressed.

The drive signal generator 14 is realized by, for example, a digital signal processing circuit. In this case, a signal to be input to the drive signal generator 14 is converted by an A/D converter into a digital signal, and a signal output from the drive signal generator 14 is converted by a D/A converter into an analog signal. Alternatively, the drive signal generator 14 may be realized by an analog circuit.

Next, a method for generating drive signals VX and VY is described. Here, it is assumed that an electric field $E_{IN}$ of an optical signal to be input to the optical remodulator 100 is represented by Formula (1).

$$\vec{E}_{IN} = \{\vec{E_H}A_H(t) + \vec{E_V}A_V(t)\}\exp(j(\omega t - \theta_{IN})) \quad (1)$$

$E_H$ and $E_V$ are unit vectors that are orthogonal to each other, and represent directions of polarizations of optical signals in a polarization multiplexed state (an H polarization signal and a V polarization signal, respectively). $A_H$ and $A_V$ represent amplitudes of the H polarization signal and the V polarization signal, respectively. ω represents a reference angular frequency of an optical signal. ω may be, for example, an angular frequency that corresponds to the vicinity of a center of a frequency range occupied by a WDM optical signal.

In this case, an output current $I_X$ of the photo detector 102a is represented by Formula (2).

$$I_X(t) \propto (A_H(t)\cos\psi + A_V(t)\sin\psi)(A_H^*(t)\cos\psi + A_V^*(t)\sin\psi) = \quad (2)$$
$$A_H(t)A_H^*(t)\cos^2\psi + (A_H(t)A_V^*(t) +$$
$$A_V(t)A_H^*(t))\cos\psi\sin\psi + A_V(t)A_V^*(t)\sin^2\psi$$

Further, an output current $I_Y$ of the photo detector 102b is represented by Formula (3).

$$I_Y(t) \propto (A_H(t)\sin\psi + A_V(t)\cos\psi)(A_H^*(t)\sin\psi + A_V^*(t)\cos\psi) = \quad (3)$$
$$A_H(t)A_H^*(t)\sin^2\psi + (A_H(t)A_V^*(t) +$$
$$A_V(t)A_H^*(t))\cos\psi\sin\psi + A_V(t)A_V^*(t)\cos^2\psi$$

ψ represents an angle between a polarization vector $E_H$ of a signal and a polarization plane of a polarization beam splitter that separates an input optical signal into an optical signal X and an optical signal Y. * represents a complex conjugate.

A transfer function of the low pass filters 105a and 105b may be set, for example, as represented by Formula (4).

$$H(\omega) = \frac{8\delta}{9} \times \frac{1 - \exp(-\alpha L + j\Delta\beta\omega L)}{\alpha - j\Delta\beta\omega} \quad (4)$$

γ represents a nonlinear parameter of an optical fiber. α represents a fiber loss. Δβ represents a wavelength dispersion factor of the optical fiber. L represents a length of an optical transmission link (a span length). In other words, the low pass filters 105a and 105b are designed such that Formula (4) is satisfied. For example, when the low pass filters 105a and 105b are realized by a digital filter, the filter coefficient calculator 104 calculates, according to transmission link information, filter coefficients such that the transmission function satisfies Formula (4).

The drive signal VX is generated by filtering the current signal $I_X$ using the low pass filter 105a. Likewise, the drive signal VY is generated by filtering the current signal $I_Y$ using the low pass filter 105b. Thus, the drive signals VX and VY are represented by Formula (5).

$$V_X(t) = kI_X \otimes h(t)$$

$$V_Y(t) = kI_Y \otimes h(t) \quad (5)$$

h(t) represents an inverse Fourier transform of the transfer function H (ω) represented by Formula (4). k is a coefficient (a specified real number) to adjust amplitudes of the drive signals VX and VY.

Although it is not illustrated in FIG. 9, upon generating the drive signal VX, the drive signal generator 14 may use a sum of the output of the low pass filter 105a and the output of the low pass filter 105b that is multiplied by k2 that is a coefficient other than k. Likewise, upon generating the drive signal VY, the drive signal generator 14 may use a sum of the output of the low pass filter 105b and the output of the low pass filter 105a that is multiplied by k3 that is a coefficient other than k. These coefficients k2 and k3 may be determined by the remodulation function setting unit 13 according to the transmission link information.

Alternatively, upon generating the drive signal VX, the drive signal generator 14 may use a sum of the output of the low pass filter 105a and a signal generated by filtering the current signal $I_Y$ using the low pass filter having different coefficients than that of the low pass filter 105b. Likewise, upon generating the drive signal VY, the drive signal generator 14 may use a sum of the output of the low pass filter 105b and a signal generated by filtering the current signal $I_X$ using the low pass filter having different coefficients than that of the low pass filter 105a.

As described above, the optical remodulator 100 includes the phase modulators 103X and 103Y that respectively correspond to eigen polarization states X and Y that are orthogonal to each other. Electric signals that respectively correspond to polarization components respectively processed by the phase modulators 103X and 103Y are detected, and the drive signal generator 14 filters these electric signals using low pass filters, so as to generate drive signals VX and VY. Then the phase modulators 103X and 103Y respectively modulate an input WDM optical signal according to the generated drive signals VX and VY. As a result, a cross-phase modulation of each optical signal in a WDM optical signal is cancelled or suppressed.

Further, in the first embodiment, an input optical signal is modulated using the phase modulators 103X and 103Y that respectively correspond to eigen polarization states X and Y that are orthogonal to each other, so a cross-phase modulation of an optical signal of arbitrary polarization state can be suppressed. For example, it is assumed that the polarization multiplexed optical signal of FIG. 4B is input to the optical remodulator 100. In FIG. 4B, an X-direction represents an eigen polarization of the phase modulator 103X, and a Y-direction represents an eigen polarization of the phase modulator 103Y. $E_H$ and $E_V$ represent directions of polarizations of signals (the H polarization signal and the V polarization signal, respectively) that are multiplexed in the polarization multiplexed optical signal. In other words, the polarization state of the input optical signal is rotated by an angle ψ with respect to the eigen polarization state of the optical remodulator 100.

In this case, the drive signal VX that controls a modulation performed by the phase modulator 103X is generated according to the current signal $I_X$ represented by Formula (2). In other words, the drive signal VX is generated according to the H polarization component, the V polarization component, and the angle ψ. Likewise, the drive signal VY that controls a modulation performed by the phase modulator 103Y is generated according to the current signal $I_Y$ represented by Formula (3). In other words, the drive signal VY is also generated according to the H polarization component, the V polarization component, and the angle ψ.

Thus, the input optical signal is divided according to the angle ψ, so as to be properly modulated by the phase modulators 103X and 103Y.

For example, when ψ=0, the H polarization signal is modulated in the phase modulator 103X according to the drive signal VX, and the V polarization signal is modulated in the phase modulator 103Y according to the drive signal VY. Further, when ψ=90, the H polarization signal is modulated in the phase modulator 103Y according to the drive signal VY, and the V polarization signal is modulated in the phase modulator 103X according to the drive signal VX. When ψ is a different angle, the H polarization signal is modulated in the phase modulators 103X and 103Y according to the drive signals VX and VY, and the V polarization signal is modulated in the phase modulators 103X and 103Y according to the drive signals VX and VY. Thus, the optical remodulator 100 is able to modulate an input optical signal properly without depending on the polarization state of the input optical signal.

In other words, the first embodiment provides the following advantages without providing a polarization controller at an input side of an optical modulator.
(1) It is possible to modulate an optical signal of an arbitrary polarization state.
(2) It is possible to suppress a cross-phase modulation in a polarization multiplexed optical signal.
(3) It is possible to suppress a cross-phase modulation of each optical signal in a WDM optical signal even though not all of the polarization states of the optical signals are the same.

In the example of FIG. 9, the polarization diversity phase modulator 103 includes the phase modulators 103X and 103Y, but the first embodiment is not limited to this configuration. For example, the polarization diversity phase modulator 103 may be configured to include an I/Q modulator with respect to each of the X polarization and the Y polarization. In this case, the drive signal VX includes an I-arm drive signal VX_I and a Q-arm drive signal VX_Q, and the I-arm drive signal VX_I and the Q-arm drive signal VX_Q are respectively provided to an I-arm and a Q-arm of the I/Q modulator provided for the X polarization. Likewise, the drive signal VY includes an I-arm drive signal VY_I and a Q-arm drive signal VY_Q, and the I-arm drive signal VY_I and the Q-arm drive signal VY_Q are respectively provided to an I-arm and a Q-arm of the I/Q modulator provided for the Y polarization.

<Second Embodiment>

In a second embodiment, an optical remodulator generates RZ-pulsed optical signal with a clock signal that is synchronized with a data signal. Thus, RZ pulse generation is simply explained before a configuration and an operation of the optical remodulator of the second embodiment are described.

Figure 10:
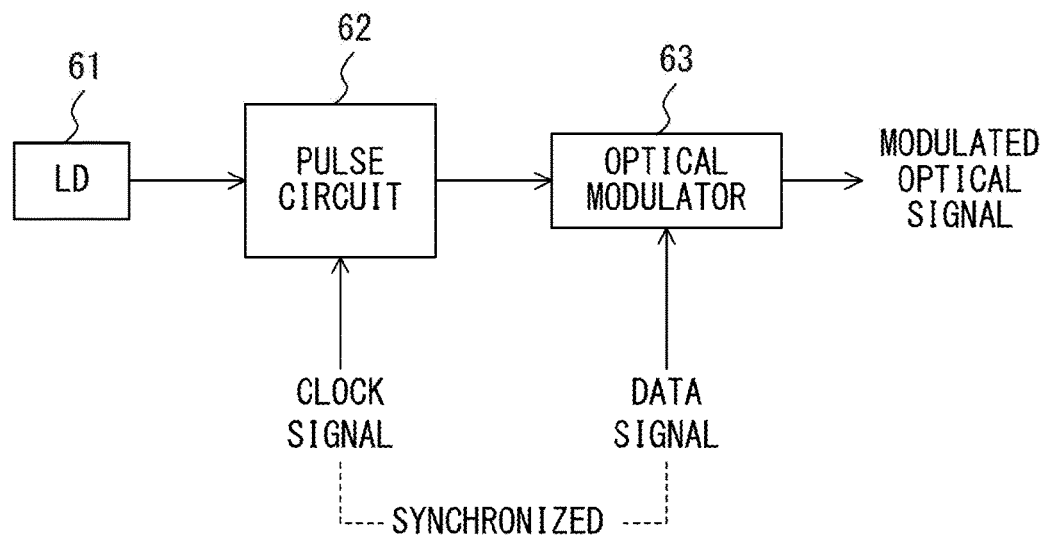
FIG. 10 illustrates an example of a RZ pulsation.

FIG. 10 illustrates an example of RZ pulse generation. In this example, a light source 61 generates a carrier light. The carrier light is, for example, continuous wave light. A pulse circuit 62 modulates an intensity of the carrier light with a clock signal that is synchronized with data, so as to generate an RZ pulse. The clock signal is, for example, a sine wave. An optical modulator 63 modulates the pulsed carrier light with the data. In other words, a pulsed modulated optical signal is generated. As a result, a transmission distance is expected to be made longer.

Figure 11:
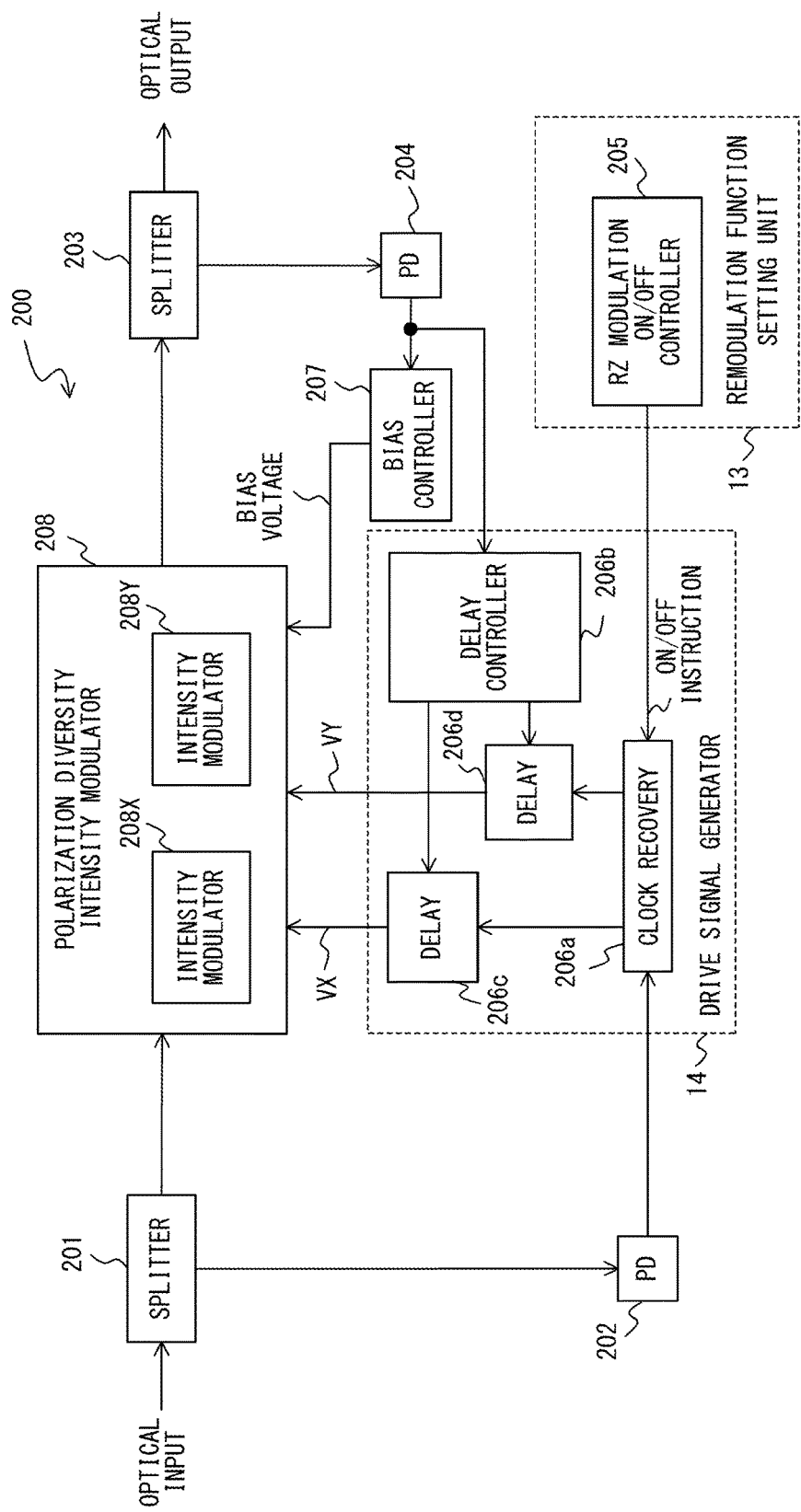
FIG. 11 illustrates an example of the optical remodulator of a second embodiment.

FIG. 11 illustrates an example of an optical remodulator 200 according to a second embodiment. As illustrated in FIG. 11, the optical remodulator 200 includes an optical splitter 201, a photo detector 202, an optical splitter 203, a photo detector 204, the remodulation function setting unit 13, the drive signal generator 14, a bias controller 207, and a polarization diversity intensity modulator 208. The polarization diversity intensity modulator 208 may be configured in the parallel-type illustrated in FIG. 3A or 3B, or the serial-type illustrated in FIG. 5A or 5B.

The optical remodulator 200 is provided, for example, in the position C1 or B2 illustrated in FIG. 1 and generates RZ-pulsed optical signal as illustrated in FIG. 10. As an example, it is assumed that the transmitter 3 of FIG. 1 does not include the pulse circuit 62 of FIG. 10. In this case, an optical remodulator provided in the position C1 performs RZ-pulse generation for a modulated optical signal output from the transmitter 3.

An optical signal of a certain wavelength is input to the optical remodulator 200. The input optical signal may be a single-polarization optical signal or a polarization multiplexed optical signal. The input optical signal is guided to the polarization diversity intensity modulator 208. Further, the input optical signal is split by the optical splitter 201 and guided to the photo detector 202. The photo detector 202 converts, into an electric signal, the input optical signal guided from the optical splitter 201.

The optical splitter 203 splits an optical signal output from the polarization diversity intensity modulator 208 and guides the optical signal to the photo detector 204. The photo detector 204 converts, into an electric signal, the optical signal guided from the optical splitter 203.

The remodulation function setting unit 13 includes an RZ modulation ON/OFF controller 205. The RZ modulation ON/OFF controller 205 generates an ON/OFF instruction that indicates whether RZ pulse generation is to be performed. Whether RZ pulse generation is to be performed is determined by, for example, a user or a network administrator.

The drive signal generator 14 includes a clock recovery 206a, a delay controller 206b, and variable delays 206c and 206d. The drive signal generator 14 is realized by, for example, an analog electronic circuit.

The clock recovery 206a recovers, according to an electric signal output from the photo detector 202, a clock signal synchronized with data transmitted by an input optical signal. The clock signal is recovered using a known technology. For example, when the data is transmitted by phase modulation, the clock recovery 206a monitors a change in a waveform of an intensity of an optical signal according to the electric signal output from the photo detector 202. Then, according to the specific characteristics included in the change in the waveform of an intensity of an optical signal, the clock recovery 206a recovers a clock signal that is frequency-synchronized with a code modulation rate of the optical signal, using a known circuit for detecting a timing error. Then, the clock recovery 206a outputs the recovered clock signal as drive signals VX and VY. Thus, the drive signals VX and VY have the same waveform. The waveforms of the drive signals VX and VY are, for example, sine waves.

The variable delay 206c delays the drive signal VX according to an instruction given by the delay controller 206b. Likewise, the variable delay 206d delays the drive signal VY according to an instruction given by the delay controller 206b. The delay controller 206b determines delay amounts of the variable delays 206c and 206d according to the electric signal output from the photo detector 204.

The polarization diversity intensity modulator 208 modulates the input optical signal with the drive signals VX and VY so as to generate an output optical signal. Specifically, an intensity modulator 208X intensity-modulates the input optical signal with the drive signal VX, and an intensity modulator 208Y intensity-modulates the input optical signal with the drive signal VY. For example, in the configuration in which the intensity modulator 208X and the intensity modulator 208Y are arranged in parallel, the intensity modulator 208X intensity-modulates, with the drive signal VX, an optical signal X obtained from the input optical signal, and the intensity modulator 208Y intensity-modulates, with the drive signal VY, an optical signal Y obtained from the input optical signal. Then, output optical signals of the intensity modulators 208X and 208Y are combined by a polarization beam combiner. As a result, a modulated optical signal that is RZ-pulsed by the clock signal synchronized with data is generated.

The bias controller 207 controls a bias voltage of the polarization diversity intensity modulator 208 according to an electric signal output from the photo detector 204. In other words, the bias voltage generated by the bias controller 207 is provided to the polarization diversity intensity modulator 208 (the intensity modulators 208X and 208Y). At this point, the bias controller 207 controls the bias voltage by a feedback control so that the electric signal output from the photo detector 204 will get closer to a target value.

In the optical remodulator 200 illustrated in FIG. 11, when a RZ pulse generated by a drive signal VX is shifted from a symbol timing of an input optical signal, an average optical power of an output optical signal of the polarization diversity intensity modulator 208 is reduced. Thus, the delay controller 206b controls the delay amount of the variable delay 206c such that the average optical power of the output optical signal of the polarization diversity intensity modulator 208 is increased. Likewise, the delay controller 206b controls the delay amount of the variable delay 206d such that the average optical power of the output optical signal of the polarization diversity intensity modulator 208 is increased. The control of the delay amount of the variable delay 206c and the control of the delay amount of the variable delay 206d are performed individually.

As described above, the optical remodulator 200 of the second embodiment modulates an input optical signal so as to generate optical RZ pulses. Thus, even in an optical network in which an optical transmitter does not have a function to generate optical RZ pulses, RZ pulse generation is realized on a transmission link, so it is possible to make a transmission distance of an optical signal longer. Further, remodulation is performed by the polarization diversity modulator of FIG. 3A, 3B, 5A or 5B, so RZ pulse generation is realized with high modulation efficiency, no matter what state the polarization of an input optical signal is in, or even if the input optical signal is a polarization multiplexed optical signal.

<Third Embodiment>

In a third embodiment, an optical remodulator shifts a frequency of an optical signal or frequencies of a plurality of optical signals in a WDM optical signal. Thus, a frequency shift of an optical signal is simply explained before a configuration and an operation of the optical remodulator of the third embodiment are described.

In a WDM transmission system, a plurality of wavelength channels are allocated at a specified frequency spacing Δf. In this example, Δf=25 GHz. An optical signal is transmitted through a specified wavelength channel. In the example of FIG. 12A, optical signals a-g are transmitted.

Further, in the WDM transmission system, an unused continuous frequency band may be needed. For example, in the WDM optical signal illustrated in FIG. 12A, a wider unused band is obtained between the optical signals c and d if a frequency of the optical signal d is made higher by 25 GHz.

FIG. 12B illustrates an example of a frequency shift device that shifts a frequency of a specified optical signal in the WDM optical signal. The frequency shift device includes a wavelength selective switch (WSS) 71, frequency shifters 72 (72-1, 72-2, . . . ), and a combiner 73. The wavelength selective switch 71 outputs each optical signal in the WDM optical signal according to a selection instruction. For example, an optical signal (the optical signals a-c and e-g) whose frequency is to be maintained is guided to the combiner 73 through an optical path 74. Further, an optical signal (the optical signal d) whose frequency is to be shifted by 25 GHz is guided to the frequency shifter 72-1. The selection instruction is given by a user or a network administrator. Alternatively, the selection instruction is given by a network management system that manages the WDM transmission system.

The frequency shifters 72-1 and 72-2 respectively shift frequencies of an input optical signal by 25 GHz and 50 GHz. The combiner 73 combines an optical signal received through the optical path 74 and output optical signals of the frequency shifters 72-1 and 72-2. This configuration makes it possible to shift a desired optical signal in the WDM optical signal by a desired frequency.

The combiner 73 may be realized by a passive optical coupler, but it may also be realized by a wavelength selective switch. In the latter case, a passive optical splitter may be used instead of the wavelength selective switch (WSS) 71.

FIG. 12C illustrates an example of the frequency shifter 72. In this example, the frequency shifter 72 is realized by an I/Q modulator. The I/Q modulator includes an I-arm modulator 75, a Q-arm modulator 76, and a phase shifter 77. The phase shifter 77 provides a phase difference π/2 between an I-arm and a Q-arm. An oscillator 78 generates an oscillation signal LO. For example, in a frequency shifter that shifts a frequency of an input light by 25 GHz, the oscillator 78 generates an oscillation signal LO of 25 GHz. The oscillation signal LO is provided to the I-arm modulator 75 and the Q-arm modulator 76 as a drive signal. However, the phase of the oscillation signal LO provided to the Q-arm modulator 76 is shifted by a phase shifter 79 by π/2.

In the example of FIG. 1, the optical remodulator of the third embodiment is provided in the position B1 or B2. Further, the optical remodulator of the third embodiment is used as, for example, the frequency shifter 72 of FIG. 12B. However, the configuration of the optical remodulator of the third embodiment is different from the configuration illustrated in FIG. 12C.

Figure 13:
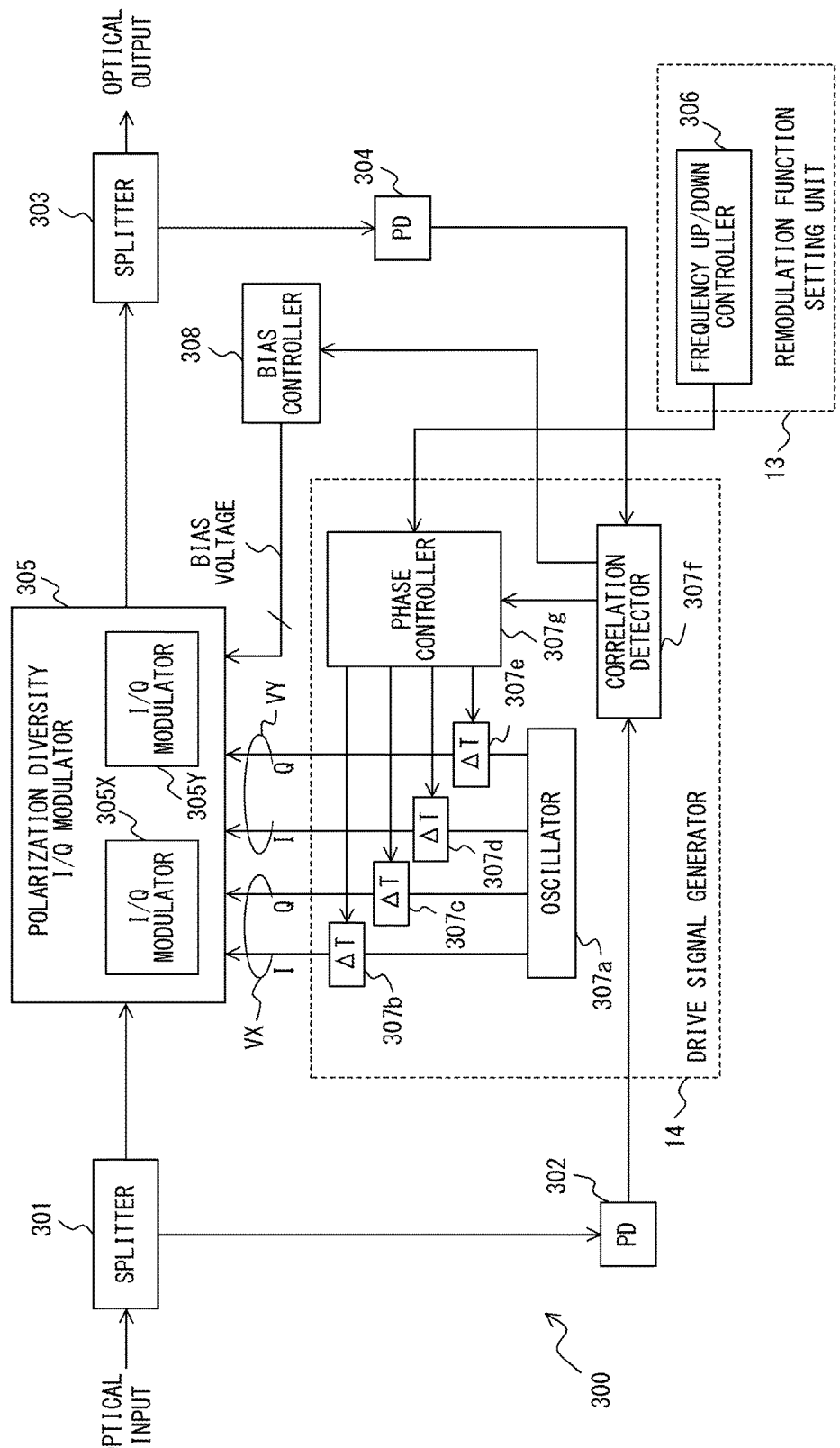
FIG. 13 illustrates an example of the optical remodulator of a third embodiment.

FIG. 13 illustrates an example of an optical remodulator 300 according to the third embodiment. As illustrated in FIG. 13, the optical remodulator 300 includes an optical splitter 301, a photo detector 302, an optical splitter 303, a photo detector 304, a polarization diversity I/Q modulator 305, the remodulation function setting unit 13, the drive signal generator 14, and a bias controller 308. The polarization diversity I/Q modulator 305 may be configured in the parallel-type illustrated in FIG. 3A or 3B, or the serial-type illustrated in FIG. 5A or 5B.

For example, an optical signal of a wavelength channel or optical signals of a plurality of wavelength channels that are extracted from a WDM optical signal is/are input to the optical remodulator 300. In the example of FIGS. 12A and 12B, the optical signal d is extracted by the wavelength selective switch 71, and the optical signal d is guided to the optical remodulator 300 that operates as the frequency shifter 72.

The input optical signal is guided to the polarization diversity I/Q modulator 305. Further, the input optical signal is split by the optical splitter 301 and the optical signal is guided to the photo detector 302. The photo detector 302 converts, into an electric signal, the input optical signal guided from the optical splitter 301.

The optical splitter 303 splits an optical signal output from the polarization diversity I/Q modulator 305 and guides the optical signal to the photo detector 304. The photo detector 304 converts, into an electric signal, the optical signal guided from the optical splitter 303.

The polarization diversity I/Q modulator 305 includes I/Q modulators 305X and 305Y. In the parallel type illustrated in FIG. 3A or 3B, the I/Q modulators 305X and 305Y respectively correspond to the optical modulators 22 and 23. Further, in the serial type illustrated in FIG. 5A or 5B, the I/Q modulators 305X and 305Y respectively correspond to the optical modulators 41 and 42. Each of the I/Q modulators 305X and 305Y has, for example, the configuration illustrated in FIG. 12C. A drive signal VX (VX_I and VX_Q) generated by the drive signal generator 14 is provided to an I-arm and a Q-arm of the I/Q modulator 305X. A drive signal VY (VY_I and VY_Q) generated by the drive signal generator 14 is provided to an I-arm and a Q-arm of the I/Q modulator 305Y.

The remodulation function setting unit 13 includes a frequency up/down controller 306. The frequency up/down controller 306 generates an up/down instruction that indicates whether to make a frequency of an input optical signal higher or lower. Whether to make a frequency of an input optical signal higher or lower is determined by, for example, a user or a network administrator.

The drive signal generator 14 includes an oscillator 307a, variable delays 307b-307e, a correlation detector 307f, and a phase controller 307g. The drive signal generator 14 is realized by, for example, a digital signal processing circuit.

The oscillator 307a generates an oscillation signal of a specified frequency. For example, when the optical remodulator 300 shifts a frequency of an input optical signal by 25 GHz, the oscillator 307a generates an oscillation signal of 25 GHz. The waveform of an oscillation signal is, for example, a sine wave. This oscillation signal is used as drive signals VX_I, VX_Q, VY_I, and VY_Q. The variable delays 307b, 307c, 307d, and 307e delay the drive signals VX_I, VX_Q, VY_I, and VY_Q, respectively. A delay amount of each of the variable delays 307b-307e is specified by the phase controller 307g.

The correlation detector 307f calculates a correlation between the waveform of an output signal of the photo detector 302 and the waveform of an output signal of the photo detector 304. In other words, the correlation between the waveform of an input optical signal and the waveform of an output optical signal is calculated. Alternatively, the correlation detector 307f may detect a difference between the waveform of an output signal of the photo detector 302 and the waveform of an output signal of the photo detector 304.

The phase controller 307g determines a delay amount of each of the variable delays 307b-307e according to an up/down instruction generated by the frequency up/down controller 306. For example, it is assumed that, when the phase of a drive signal provided to a Q-arm of an I/Q modulator is delayed by $\pi/2$ with respect to the phase of a drive signal provided to its I-arm, the frequency of an optical signal modulated by the I/Q modulator is made higher. In this case, when the up/down instruction indicates "up", the phase controller 307g controls the delay amounts of the variable delays 307b and 307c such that the phase of the drive signal VX_Q is delayed by $\pi/2$ with respect to the phase of the drive signal VX_I, and controls the delay amounts of the variable delays 307d and 307e such that the phase of the drive signal VY_Q is delayed by $\pi/2$ with respect to the phase of the drive signal VY_I. Conversely, when the up/down instruction indicates "down", the phase controller 307g controls the delay amounts of the variable delays 307b and 307c such that the phase of the drive signal VX_Q is advanced by $\pi/2$ with respect to the phase of the drive signal VX_I, and controls the delay amounts of the variable delays 307d and 307e such that the phase of the drive signal VY_Q is advanced by $\pi/2$ with respect to the phase of the drive signal VY_I.

Further, the phase controller 307g adjusts the delay amount of each of the variable delays 307b-307e according to a correlation value calculated by the correlation detector 307f. In this case, when a frequency of an input optical signal is shifted using an I/Q modulator, the intensity of an output optical signal of the I/Q modulator fluctuates if the phase difference in a drive signal between I and Q is shifted away from an optimum value (that is, $\pi/2$). In other words, an accurate frequency shift is realized if the phase of each drive signal is adjusted such that the fluctuation of the intensity of an output optical signal of the I/Q modulator is reduced.

Thus, the phase controller 307g monitors the fluctuation of the intensity of an output optical signal of the I/Q modulator using a correlation value calculated by the correlation detector 307f. At this point, if the correlation between the waveform of an output signal of the photo detector 302 and the waveform of an output signal of the photo detector 304 is higher (or if the difference between the waveform of an output signal of the photo detector 302 and the waveform of an output signal of the photo detector 304 is smaller), the fluctuation of the intensity of an output optical signal of the I/Q modulator is smaller. Accordingly, the phase controller 307g adjusts the delay amounts of the variable delays 307b-307e such that the correlation value calculated by the correlation detector 307f is made larger. As a result, an accurate frequency shift is realized.

The bias controller 308 controls a bias voltage for the I/Q modulators 305X and 305Y such that the correlation value calculated by the correlation detector 307f is made larger. At this point, the following bias controls are performed for each of the I/Q modulators 305X and 305Y.

(1) Control a bias voltage such that an operation point of a Mach-Zehnder modulator of an I-arm (the I-arm modulator 75 in FIG. 12C) gets closer to a null.
(2) Control a bias voltage such that an operation point of a Mach-Zehnder modulator of a Q-arm (the Q-arm modulator 76 in FIG. 12C) gets closer to a null.
(3) Control a bias voltage such that a phase difference between I and Q (the phase shifter 77 in FIG. 12C) gets closer to $\pi/2$.

As described above, the optical remodulator 300 of the third embodiment modulates an input optical signal so as to shift a frequency of an input optical signal. Further, remodulation is performed by the polarization diversity modulator of FIG. 3A, 3B, 5A or 5B, so a frequency shift is realized with high modulation efficiency, no matter what state the polarization of an input optical signal is in, or even if the input optical signal is a polarization multiplexed optical signal.

In the example described above, up/down of a frequency is performed by controlling a phase of a drive signal, but the third embodiment is not limited to this scheme. For example, the up/down of a frequency may be realized by inverting an operation point of a phase shifter (the phase shifter 77 in FIG. 12C) that provides a specified phase difference between I and Q of each I/Q modulator, that is, by controlling the operation point at $-\pi/2$. Further, when an optical power detected by the photo detector 302 or the photo detector 304 is lower than a specified threshold, the optical remodulator 300 may stop the generation of an oscillation signal and/or the control of a bias voltage.

<Fourth Embodiment>

In a fourth embodiment, an optical remodulator rewrites or deletes a supervisory signal in an optical network in which a dual-modulated optical signal that carries a data signal and the supervisory signal is transmitted. Thus, the dual-modulated optical signal that carries a data signal and a supervisory signal is simply explained before a configuration and an operation of the optical remodulator of the fourth embodiment are described.

FIGS. 14A and 14B illustrate examples of an optical transmitter that generates a dual-modulated optical signal. In the example of FIG. 14A, the optical transmitter includes a frequency tunable laser light source 81 and an optical modulator 82. The frequency tunable laser light source 81 oscillates at a frequency corresponding to a signal provided to a control terminal of the frequency tunable laser light source 81. Thus, when a supervisory signal is provided to the control terminal, the frequency of an output light of the frequency tunable laser light source 81 varies according to the supervisory signal. As a result, a frequency modulated optical signal that carries a supervisory signal is generated. The optical modulator 82 modulates, with a data signal, the frequency modulated optical signal output from the frequency tunable laser light source 81. Accordingly, a dual-modulated optical signal that carries the data signal and the supervisory signal is generated.

In the example of FIG. 14B, the optical transmitter includes a mapping circuit 83, a rotational transform circuit 84, a D/A converter 85, a laser light source 86, and an optical modulator 87. The mapping circuit 83 maps a data signal according to a specified modulation scheme so as to generate a complex electric-field information signal. According to a supervisory signal, the rotational transform circuit 84 rotates, around an origin point, the electric-field information signal generated by the mapping circuit 83. As an example, it is assumed that the supervisory signal is a binary signal. In this case, the rotational transform circuit 84 performs the following processing for the electric-field information signal.

(1) When the supervisory signal is "1", the phase of an electric-field information signal is advanced by $\Delta\theta$ per unit time.
(2) When the supervisory signal is "0", the phase of an electric-field information signal is delayed by $\Delta\theta$ per unit time.

The D/A converter 85 converts the electric-field information signal output from the rotational transform circuit 84 into an analog drive signal. The laser light source 86 generates continuous wave light of a specified optical frequency. The optical modulator 87 modulates, with the analog drive signal, the continuous wave light output from the laser light source 86, so as to generate a dual-modulated optical signal.

In the fourth embodiment, it is assumed that a baud rate of a supervisory signal is sufficiently low, compared with that of a data signal. For example, the analog bandwidth of a data signal is about a few GHz to 10 GHz, and the analog bandwidth of a supervisory signal is about tens of Hz to hundreds of MHz.

Figure 15:
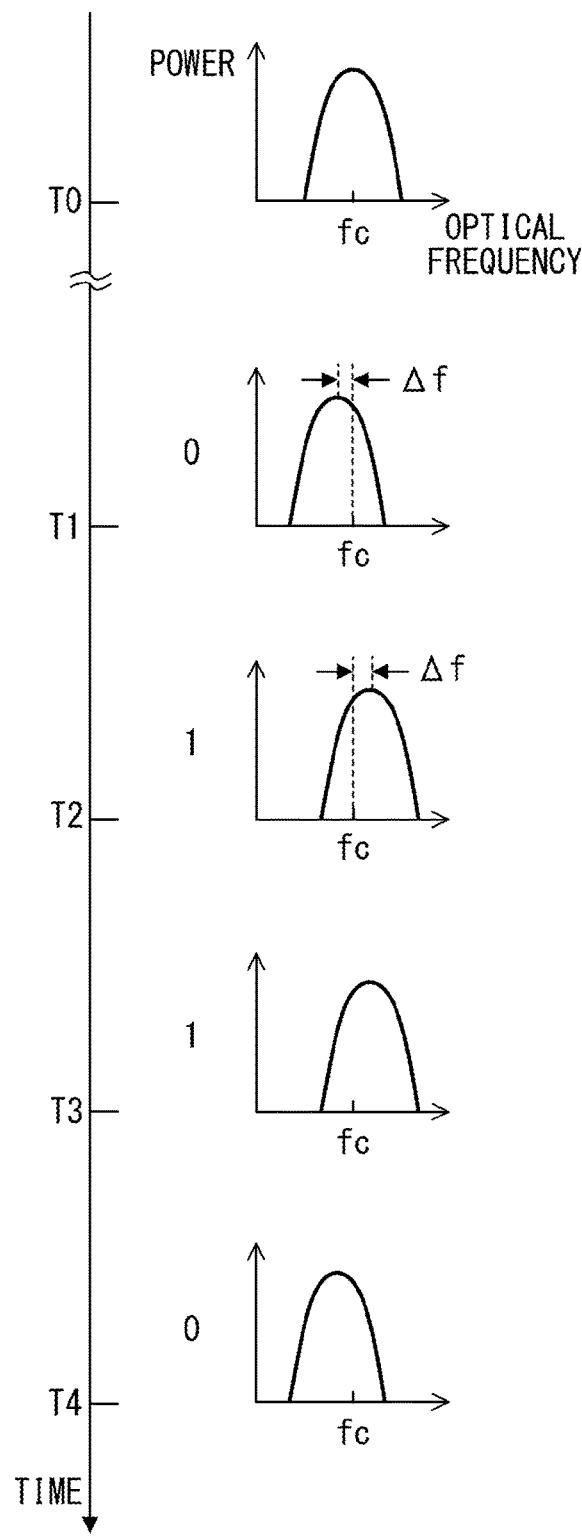
FIG. 15 is a diagram that explains frequency modulation.

FIG. 15 is a diagram that explains frequency modulation. FIG. 15 illustrates a time-resolved output spectrum of an optical transmitter at time T0 and at times T1-T4. The width and the shape of an optical spectrum at each time is dependent on, for example, the modulation scheme and the modulation rate of a data signal. As already described with reference to FIGS. 14A and 14B, a supervisory signal is superimposed on an optical signal output from the optical transmitter by frequency modulation. In the example of FIG. 15, the supervisory signal is a digital code, and the code superimposed on the optical signal at each of the times T1-T4 is "0110". Further, the center frequency of carrier light used by the optical transmitter is fc.

At the time T0, a supervisory signal is not superimposed on the optical signal. In this case, the optical transmitter does not shift the center frequency of the optical signal. Thus, the center frequency of the spectrum of the optical signal output at the time T0 is fc.

At the time T1, "0" is superimposed on the optical signal. In this case, in this example, the optical transmitter shifts the frequency of the optical signal by $-\Delta f$. Thus, the center frequency of the spectrum of the optical signal output at the time T1 is fc$-\Delta f$.

At the time T2, "1" is superimposed on the optical signal. In this case, in this example, the optical transmitter shifts the frequency of the optical signal by $+\Delta f$. Thus, the center frequency of the spectrum of the optical signal output at the time T2 is fc$+\Delta f$. Likewise, the center frequency of the spectrum of the optical signal output at the time T3 is fc$+\Delta f$, and the center frequency of the spectrum of the optical signal output at the time T4 is fc$-\Delta f$.

$\Delta f$ is sufficiently small, compared with the frequency of the carrier light. However, if $\Delta f$ is too small, it is difficult to detect the supervisory signal in a receiver. Thus, it is preferable that $\Delta f$ be determined properly in consideration of these factors. For example, $\Delta f$ is about 1 MHz to 1 GHz.

In the example of FIG. 15, the frequency shifts when the supervisory signals are "0" and "1" are "$-\Delta f$" and "$+\Delta f$", respectively, but the fourth embodiment is not limited to this scheme. For example, the frequency shifts when the supervisory signals are "0" and "1" may be "$+\Delta f$" and "$-\Delta f$", respectively. Further, the frequency shift when the supervisory signal is "0 (or 1) " may be zero, and the optical frequency may be shifted when the supervisory signal is "1 (or 0)". Furthermore, the supervisory signal may be superimposed on an optical signal using multi-level frequency shift keying other than binary frequency shift keying, or by frequency modulation using analog information.

FIGS. 16A and 16B are diagrams that explain a detection of a frequency modulated signal. In this case, an optical signal carries a data signal and a supervisory signal. As described above, the supervisory signal is superimposed on the optical signal by frequency modulation. Thus, the supervisory signal may hereinafter be referred to as an "FSK signal". The center frequency of the optical signal is fc.

A circuit that detects an FSK signal from the above-described optical signal includes, for example, an optical filter 91, a photo detector 92, and a detector 93, as illustrated in FIG. 16A. An input optical signal is guided to the optical filter 91. As described above, a data signal and an FSK signal are superimposed on the input optical signal. Thus, as illustrated in FIG. 16B, the center frequency of the optical signal varies between fc$-\Delta f$ and fc$+\Delta f$ according to the FSK signal. FIG. 16B illustrates a spectrum of the optical signal and a transmission band of the optical filter 91.

The photo detector 92 converts output light of the optical filter 91 (that is, an optical signal filtered by the optical filter 91) into an electric signal. The electric signal represents a power of the output light of the optical filter 91. Here, the power of the output light of the optical filter 91 is represented by either of the areas of shaded portions illustrated in FIG. 16B. For example, the power of the output light of the optical filter 91 is represented by P1 when the center frequency of the optical signal is fc−Δf, and is represented by P2 when the center frequency of the optical signal is fc+Δf. As a result, the FSK signal is converted into an intensity signal.

It is assumed that the data signal is averaged, for example, by a limit of an electrical bandwidth in the photo detector 92. The DC component of the averaged data signal is deleted by, for example, a DC component removal capacitor provided between the photo detector 92 and the detector 93.

The detector 93 detects an FSK signal from an output signal of the photo detector 92. For example, when the output signal of the photo detector 92 is higher than a specified threshold, the detector 93 decides that the FSK signal is "1", and when the output signal of the photo detector 92 is lower than or equal to the specified threshold, the detector 93 decides that the FSK signal is "0". As described above, a receiver that includes the detection circuit of FIG. 16A can detect a supervisory signal from a dual-modulated optical signal that carries a data signal and the supervisory signal.

The optical remodulator of the fourth embodiment remodulates the dual-modulated optical signal on an optical transmission link, so as to rewrite or delete a supervisory signal. The configuration and the operation of the optical remodulator of the fourth embodiment are described below.

Figure 17:
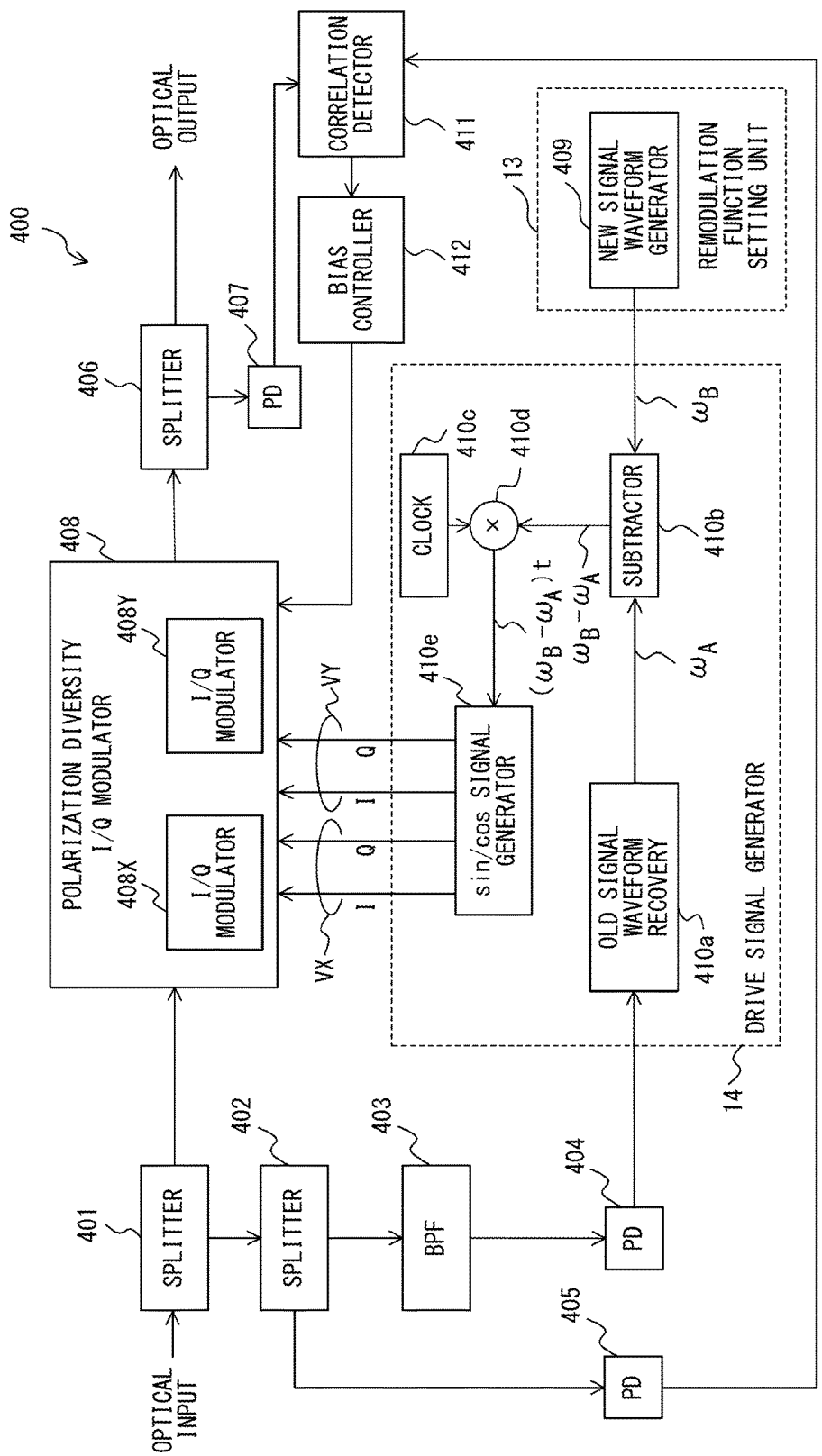
FIG. 17 illustrates an example of the optical remodulator of a fourth embodiment.

FIG. 17 illustrates an example of an optical remodulator 400 according to the fourth embodiment. As illustrated in FIG. 17, the optical remodulator 400 includes optical splitters 401 and 402, an optical bandpass filter (BPF) 403, photo detectors 404 and 405, an optical splitter 406, a photo detector 407, a polarization diversity I/Q modulator 408, the remodulation function setting unit 13, the drive signal generator 14, a correlation detector 411, and a bias controller 412. The polarization diversity I/Q modulator 408 may be configured in the parallel-type illustrated in FIG. 3A or 3B, or the serial-type illustrated in FIG. 5A or 5B.

A dual-modulated optical signal that carries a data signal and a supervisory signal is input to the optical remodulator 400. As illustrated in FIGS. 14A-15, the supervisory signal is superimposed on an optical signal by frequency modulation. Further, a symbol rate of the supervisory signal is sufficiently low, compared with that of the data signal.

The input optical signal is guided to the polarization diversity I/Q modulator 408. Further, the input optical signal is split by the optical splitters 401 and 402, and the optical signal is guided to the optical BPF 403 and the photo detector 405. The optical BPF 403 corresponds to the optical filter 91 illustrated in FIG. 16A and passes a portion of a spectrum of the input optical signal. Specifically, the optical BPF 403 passes a frequency component shifted, by a specified amount, to a high frequency side or a low frequency side with respect to the center frequency of an optical spectrum formed by the data signal. Further, the width of a passband of the optical BPF 403 is smaller than the width of the optical spectrum formed by the data signal. Thus, as described with reference to FIGS. 16A and 16B, the optical BPF 403 converts, into an intensity modulated optical signal, the frequency modulated optical signal superimposed on the input optical signal. The intensity modulated optical signal represents the supervisory signal. In other words, the optical BPF 403 generates an intensity modulated optical signal that represents a supervisory signal. Then, the photo detector 404 converts, into an electric signal, the intensity modulated optical signal output from the optical BPF 403. The photo detector 405 converts the input optical signal into an electric signal.

The optical splitter 406 splits an output optical signal of the polarization diversity I/Q modulator 408 and guides the optical signal to the photo detector 407. The photo detector 407 converts, into an electric signal, the optical signal guided from the optical splitter 406.

The configuration of the polarization diversity I/Q modulator 408 is substantially the same as that of the polarization diversity I/Q modulator 305 of the third embodiment. In other words, the polarization diversity I/Q modulator 408 includes I/Q modulators 408X and 408Y. In the parallel type illustrated in FIG. 3A or 3B, the I/Q modulators 408X and 408Y respectively correspond to the optical modulators 22 and 23. Further, in the serial type illustrated in FIG. 5A or 5B, the I/Q modulators 408X and 408Y respectively correspond to the optical modulators 41 and 42. Each of the I/Q modulators 408X and 408Y has, for example, the configuration illustrated in FIG. 12C. A drive signal VX (VX_I and VX_Q) generated by the drive signal generator 14 is provided to an I-arm and a Q-arm of the I/Q modulator 408X. A drive signal VY (VY_I and VY_Q) generated by the drive signal generator 14 is provided to an I-arm and a Q-arm of the I/Q modulator 408Y.

The remodulation function setting unit 13 includes a new signal waveform generator 409. The new signal waveform generator 409 generates a supervisory signal to be superimposed on an output optical signal of the optical remodulator 400. In this example, the optical remodulator 400 rewrites a supervisory signal superimposed on an input optical signal with a new supervisory signal. Thus, the supervisory signal superimposed on an input optical signal (that is, a supervisory signal recovered from an input optical signal) may be referred to as an "old signal". Further, the supervisory signal to be superimposed on an output optical signal (that is, a supervisory signal generated by the new signal waveform generator 409) may be referred to as a "new signal". The new signal is represented by $\omega_B$ in FIG. 17. The new signal is determined by, for example, a user or a network administer.

The drive signal generator 14 includes an old signal waveform recovery 410a, a subtractor 410b, a clock source 410c, a multiplier 410d, and a sin/cos signal generator 410e. The drive signal generator 14 is realized by, for example, a digital signal processing circuit.

According to an output signal of the photo detector 404, the old signal waveform recovery 410a recovers a supervisory signal superimposed on an input optical signal (that is, an old signal). The old signal is represented by $\omega_A$ in FIG. 17. When the supervisory signal is a binary signal, the old signal waveform recovery 410a may compare the output signal of the photo detector 404 with a specified threshold, so as to detect "1" or "0".

The subtractor 410b subtracts an old signal waveform from a new signal waveform. In other words, $\omega_B - \omega_A$ is calculated. The clock source 410c generates a clock signal of a specified frequency. The frequency of the clock signal corresponds to, for example, an amount of frequency shift for superimposing a supervisory signal on an optical signal by frequency modulation. In the example of FIG. 15 or 16B, the frequency of the clock signal corresponds to Δf. The multiplier 410d multiplies an output signal of the subtractor 410b by the clock signal. In other words, ($\omega_B-\omega_A$) t is generated.

The sin/cos signal generator 410e generates a sine wave signal and a cosine wave signal according to the output signal of the multiplier 410d. The frequencies of the sine wave signal and the cosine wave signal are the same. Then, the sin/cos signal generator 410e provides a sine wave signal and a cosine wave signal to the I-arm and the Q-arm of the I/Q modulator 408X as drive signals VX_I and VX_Q, respectively. Similarly, the sin/cos signal generator 410e provides a sine wave signal and a cosine wave signal to the I-arm and the Q-arm of the I/Q modulator 408Y as drive signals VY_I and VY_Q, respectively. Here, the phases of the drive signals VX_I, VX_Q, VY_I, and VY_Q are preferably adjusted such that the quality of an output optical signal is improved.

The correlation detector 411 calculates a correlation between the waveform of an output signal of the photo detector 405 and the waveform of an output signal of the photo detector 407. In other words, the correlation between the waveform of an input optical signal and the waveform of an output optical signal is calculated. Alternatively, the correlation detector 411 may detect a difference between the waveform of an output signal of the photo detector 405 and the waveform of an output signal of the photo detector 407.

The bias controller 412 controls a bias voltage for the I/Q modulators 408X and 408Y such that the correlation value calculated by the correlation detector 411 is made larger. At this point, as is the case in the third embodiment, the following bias controls are performed for each of the I/Q modulators 408X and 408Y.

(1) Control a bias voltage such that an operation point of a Mach-Zehnder modulator of an I-arm gets closer to a null.
(2) Control a bias voltage such that an operation point of a Mach-Zehnder modulator of a Q-arm gets closer to a null.
(3) Control a bias voltage such that a phase difference between I and Q gets closer to π/2.

Next, a method for generating a drive signal is described. As described above, a dual-modulated optical signal that carries a data signal and a supervisory signal is input to the optical remodulator 400. The supervisory signal is superimposed on an optical signal by frequency modulation. In this case, the supervisory signal (that is, a frequency modulated component) is not dependent on the polarization state of an input optical signal.

The electric field of an input optical signal of the optical remodulator 400 is represented by Formula (6).

$$\vec{E}_{IN} = \{\vec{E}_H A_H(t) + \vec{E}_V A_V(t)\} \exp(j(\omega+\Delta\omega_A(t))t - j\theta_{IN}) \quad (6)$$

ω represents a carrier angle frequency of a data signal. $\Delta\omega_A(t)$ represents a supervisory signal superimposed on an input optical signal (that is, an old signal).

Further, the electric field of an output optical signal of the optical remodulator 400 is represented by Formula (7).

$$\vec{E}_{OUT} = \{\vec{E}_H A_H(t) + \vec{E}_V A_V(t)\} \exp(j(\omega+\Delta\omega_B(t))t - j\theta_{OUT}) \quad (7)$$

$\Delta\omega_B(t)$ represents a supervisory signal to be superimposed on an output optical signal (that is, an new signal). In this example, the optical remodulator 400 rewrites the old signal superimposed on an input optical signal with a new signal. At this point, the optical remodulator 400 deletes the old signal from the input optical signal and adds the new signal to that optical signal. Thus, a remodulation performed by the optical remodulator 400 is represented by Formula (8).

$$\vec{E}_{OUT} = \exp(j(\Delta\omega_B(t)-\Delta\omega_A(t))t - \Delta\theta) \cdot \vec{E}_{IN} \quad (8)$$

The remodulation in Formula (8) can be represented by Formula (9) using a trigonometric function.

$$\exp j(\Delta\omega_B(t)-\Delta\omega_A(t))t = \cos(\Delta\omega_B(t)-\Delta\omega_A(t))t + j\sin(\Delta\omega_B(t)-\Delta\omega_A(t))t \quad (9)$$

Thus, if $\cos(\Delta\omega_B(t)-\Delta\omega_A(t))$ is given to each of the I-arms of the polarization diversity I/Q modulators (the I/Q modulators 408X and 408Y) and $\sin(\Delta\omega_B(t)-\Delta\omega_A(t))$ is given to each of the Q-arms of the polarization diversity I/Q modulators, the old signal superimposed on an input optical signal is replaced by the new signal.

FIG. 18 illustrates an example of rewriting of a supervisory signal in the fourth embodiment. In this example, the supervisory signal superimposed on an input optical signal (that it, an old signal) is a binary signal "0110". The center frequency of the optical signal is fc. The frequency of the optical signal is controlled to be lower by Δf than fc when the supervisory signal is "0", and the frequency of the optical signal is controlled to be higher by Δf than fc when the supervisory signal is "1".

The center frequency of the input optical signal is modulated according to the old signal. In other words, the center frequency of the input optical signal is fc−Δf, fc+Δf, fc+Δf and fc−Δf for symbols 1-4, respectively. In the optical remodulator 400, the old signal waveform recovery 410a is able to recover the old signal using the output signal of the photo detector 404.

The supervisory signal to be superimposed on an output optical signal (that is, a new signal) is "1101". Then, the subtractor 410b subtracts the old signal from the new signal. At this point, the subtractor 410b may perform the subtraction for each symbol. As a result, a remodulation component to rewrite the old signal with the new signal is determined. In this example, +2Δf, zero, −2Δf and +2Δf are respectively obtained for the symbols 1-4. Then, according to the calculated remodulation component, the sin/cos signal generator 410e generates a drive signal for rewriting the supervisory signal.

In the symbol 1, the optical remodulator 400 performs remodulation to make the frequency of an input optical signal higher by 2Δf. In other words, the drive signal generator 14 provides, to the I/Q modulators 408X and 408Y of the polarization diversity I/Q modulator 408, drive signals that make the frequencies of an input optical signal higher by 2Δf. Here, it is assumed that, when the phase of a drive signal provided to a Q-arm of an I/Q modulator is delayed by π/2 with respect to the phase of a drive signal provided to its I-arm, the frequency of an optical signal modulated by the I/Q modulator is made higher. In this case, the drive signal generator 14 generates drive signals VX_I and VX_Q such that the phase of the drive signal VX_Q is delayed by π/2 with respect to the phase of the drive signal VX_I. Further, the drive signal generator 14 generates drive signals VY_I and VY_Q such that the phase of the drive signal VY_Q is delayed by π/2 with respect to the phase of the drive signal VY_I. Here, the frequencies of all of the drive signals VX_I, VX_Q, VY_I and VY_Q are 2Δf. Note that a set of drive signals that have a phase difference of π/2 from each other can be generated by generating a sine wave signal and a cosine wave signal of the same frequency.

The polarization diversity I/Q modulator 408 modulates an input optical signal according to the drive signals generated by the drive signal generator 14. In other words, the I/Q modulator 408X modulates an input optical signal using drive signals VX_I and VX_Q provided to the I-arm and the Q-arm, respectively. Likewise, the I/Q modulator 408Y modulates the input optical signal using drive signals VY_I and VY_Q provided to the I-arm and the Q-arm, respectively. Accordingly, in the symbol 1, remodulation to make the center frequency of an input optical signal higher by 2Δf is achieved. As a result, the center frequency of an output optical signal is fc+ΔA.

In the symbol 2, the optical remodulator 400 does not change the frequency of an input optical signal. In this case, the sin/cos signal generator 410e does not generate a drive signal. In other words, the optical remodulator 400 does not perform remodulation for the input optical signal. Thus, the center frequency of an output optical signal is the same as that of the input optical signal, which is fc+Δf.

In the symbol 3, the optical remodulator 400 performs remodulation to make the frequency of an input optical signal lower by 2Δf. In other words, the drive signal generator 14 provides, to the I/Q modulators 408X and 408Y of the polarization diversity I/Q modulator 408, drive signals that make the frequencies of an input optical signal lower by 2Δf. In this case, the drive signal generator 14 generates drive signals VX_I and VX_Q such that the phase of the drive signal VX_Q is advanced by π/2 with respect to the phase of the drive signal VX_I. Further, the drive signal generator 14 generates drive signals VY_I and VY_Q such that the phase of the drive signal VY_Q is advanced by π/2 with respect to the phase of the drive signal VY_I. Accordingly, in the symbol 3, remodulation to make the center frequency of an input optical signal lower by 2Δf is achieved. As a result, the center frequency of an output optical signal is fc−fΔ. Remodulation performed for the symbol 4 is similar to the case of the symbol 1, so the descriptions will be omitted.

A receiver detects a supervisory signal from the output optical signal of the optical remodulator 400 using the detection circuit illustrated in FIG. 16A. Here, the frequencies of an optical signal that arrives at the receiver are fc+Δf, fc+Δf, fc−Δf and fc+Δf in the symbols 1-4, respectively. Thus, a supervisory signal "1101" is detected. In other words, the receiver detects a supervisory signal rewritten by the optical remodulator 400.

In the example of FIG. 18, the supervisory signal is a binary signal, but the fourth embodiment is not limited to this scheme. Further, in the above descriptions, the supervisory signal superimposed on an input optical signal is rewritten with a new supervisory signal, but the fourth embodiment is not limited to this scheme. For example, the optical remodulator 400 may delete the supervisory signal superimposed on an input optical signal. In this case, the new signal waveform generator 409 outputs "zero". In other words, $\Delta\omega_B(t)=0$ is given in Formula (8) or Formula (9). By doing this, the polarization diversity I/Q modulator 408 remodulates the input optical signal according to a drive signal such that the old signal is deleted.

In the above example, the supervisory signal is superimposed on an optical signal by frequency modulation, but the fourth embodiment is not limited to this configuration. For example, the supervisory signal may be superimposed on an optical signal by polarization modulation. In this case, the optical remodulator 400 controls the polarization state of an input optical signal by using, for example, a polarization controller, such that the old signal is rewritten with a new signal. Further, for example, the supervisory signal may be superimposed on an optical signal by intensity modulation. In this case, the optical remodulator 400 controls the intensity of an input optical signal by using, for example, an intensity controller, such that the old signal is rewritten with a new signal.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical remodulator comprising:
a polarization diversity modulator configured to modulate an input optical signal to generate an output optical signal by using a first optical modulator implemented for a first polarization state and a second optical modulator implemented for a second polarization state that is orthogonal to the first polarization state;
a photo detector configured to optical-to-electrical convert the input optical signal or the output optical signal or both of the optical signals into an electric signal; and
a drive signal generator configured to generate a first drive signal that drives the first optical modulator and a second drive signal that drives the second optical modulator based on the electric signal generated by the photo detector, wherein
the input optical signal is guided to the first optical modulator, and
an optical signal output from the first optical modulator is guided to the second optical modulator.

2. An optical remodulator comprising:
a polarization diversity modulator configured to modulate an input optical signal to generate an output optical signal by using a first optical modulator implemented for a first polarization state and a second optical modulator implemented for a second polarization state that is orthogonal to the first polarization state;
a photo detector configured to optical-to-electrical convert the input optical signal or the output optical signal or both of the optical signals into an electric signal; and
a drive signal generator configured to generate a first drive signal that drives the first optical modulator and a second drive signal that drives the second optical modulator based on the electric signal generated by the photo detector, wherein
the first optical modulator and the second optical modulator are phase modulators,
the photo detector optical-to-electrical converts a component of the first polarization state in the input optical signal so as to generate a first electric signal, and optical-to-electrical converts a component of the second polarization state in the input optical signal so as to generate a second electric signal, and
the drive signal generator respectively filters the first electric signal and the second electric signal by using low pass filters, so as to generate the first drive signal and the second drive signal.

3. An optical remodulator comprising:
a polarization diversity modulator configured to modulate an input optical signal to generate an output optical signal by using a first optical modulator implemented for a first polarization state and a second optical modulator implemented for a second polarization state that is orthogonal to the first polarization state;

a photo detector configured to optical-to-electrical convert the input optical signal or the output optical signal or both of the optical signals into an electric signal; and
a drive signal generator configured to generate a first drive signal that drives the first optical modulator and a second drive signal that drives the second optical modulator based on the electric signal generated by the photo detector, wherein
the first optical modulator and the second optical modulator are intensity modulators,
the photo detector optical-to-electrical converts the input optical signal so as to generate the electric signal, and
the drive signal generator recovers, according to the electric signal, a clock signal synchronized with a data signal transmitted by the input optical signal, and provides the clock signal to the first optical modulator and the second optical modulator as the first drive signal and the second drive signal, respectively.

4. An optical remodulator comprising:
a polarization diversity modulator configured to modulate an input optical signal to generate an output optical signal by using a first optical modulator implemented for a first polarization state and a second optical modulator implemented for a second polarization state that is orthogonal to the first polarization state;
a photo detector configured to optical-to-electrical convert the input optical signal or the output optical signal or both of the optical signals into an electric signal; and
a drive signal generator configured to generate a first drive signal that drives the first optical modulator and a second drive signal that drives the second optical modulator based on the electric signal generated by the photo detector, wherein
the first optical modulator and the second optical modulator are I/Q modulators,
the photo detector optical-to-electrical converts the input optical signal so as to generate a first electric signal, and optical-to-electrical converts the output optical signal so as to generate a second electric signal,
the drive signal generator includes:
an oscillator configured to generate first to fourth oscillation signals having a specified identical frequency,
a delay circuit configured to delay the first to fourth oscillation signals, and
a phase controller configured to control delay amounts of the first to fourth oscillation signals in the delay circuit, such that a phase difference between the first oscillation signal and the second oscillation signal is to be $\pi/2$, a phase difference between the third oscillation signal and the fourth oscillation signal is to be $\pi/2$, and a correlation between the first electric signal and the second electric signal increases, and
the first and second oscillation signals output from the delay circuit are respectively provided, as the first drive signal, to an I-arm and a Q-arm of the first optical modulator, and the third and fourth oscillation signals output from the delay circuit are respectively provided, as the second drive signal, to an I-arm and a Q-arm of the second optical modulator.

5. An optical remodulator that remodulates an input optical signal modulated by a first data signal and a second data signal to generate an output optical signal, a symbol rate of the second data signal being different from a symbol rate of the first data signal, the optical remodulator comprising:

a detector configured to optical-to-electrical convert the input optical signal or the output optical signal or both of the optical signals into an electric signal;
a drive signal generator configured to generate a drive signal based on the electric signal; and
a modulator configured to remodulate the input optical signal with the drive signal, so as to generate the output optical signal, wherein
the second data signal is superimposed on the input optical signal by frequency modulation,
the detector includes:
an optical bandpass filter configured to transmit a portion of a spectrum of the input optical signal; and
a photo detector configured to convert an output light of the optical bandpass filter into an intensity modulated signal,
the drive signal generator includes:
a signal recovery configured to recover the second data signal according to the intensity modulated signal; and
a signal generating circuit configured to generate, according to the second data signal recovered by the signal recovery, the drive signal that controls a carrier frequency of the input optical signal such that the second data signal is deleted from the output optical signal, or such that the second data signal is rewritten with a third data signal in the output optical signal.

6. The optical remodulator according to claim 5, wherein the signal generating circuit generates, according to a result of subtracting the second data signal recovered by the signal recovery from the third data signal, the drive signal that controls the carrier frequency of the input optical signal.

7. An optical remodulation method by using a polarization diversity modulator that includes a first optical phase modulator implemented for a first polarization state and a second optical phase modulator implemented for a second polarization state that is orthogonal to the first polarization state, the method comprising:
optical-to-electrical converting a component of the first polarization state in an input optical signal of the polarization diversity modulator so as to generate a first electric signal;
optical-to-electrical converting a component of the second polarization state in the input optical signal so as to generate a second electric signal;
filtering the first electric signal by using a first low pass filter so as to generate a first drive signal that drives the first optical phase modulator;
filtering the second electric signal by using a second low pass filter so as to generate a second drive signal that drives the second optical phase modulator; and
generating an output optical signal according to the first drive signal and the second drive signal by using the first optical phase modulator and the second optical phase modulator.

8. An optical remodulation method for remodulating an input optical signal modulated by a first data signal and a second data signal to generate an output optical signal, a symbol rate of the second data signal is different from a symbol rate of the first data signal, the second data signal being superimposed on the input optical signal by frequency modulation, the optical remodulation method comprising:
filtering the input optical signal by using an optical bandpass filter to transmit a portion of a spectrum of the input optical signal;

optical-to-electrical converting an output light of the optical bandpass filter into an intensity modulated signal;

recovering the second data signal according to the intensity modulated signal;

generating, according to the recovered second data signal, a drive signal that controls a carrier frequency of the input optical signal such that the second data signal is deleted from the output optical signal, or such that the second data signal is rewritten with a third data signal in the output optical signal; and remodulating the input optical signal with the drive signal to generate the output optical signal.

* * * * *